US011967783B2

(12) United States Patent
Ko et al.

(10) Patent No.: US 11,967,783 B2
(45) **Date of Patent: *Apr. 23, 2024**

(54) RECEPTACLE CONNECTOR AND CONNECTOR ASSEMBLY INCLUDING THE SAME

(71) Applicant: Molex, LLC, Lisle, IL (US)

(72) Inventors: Sang Yong Ko, Osan-si (KR); Jin Hyup Chang, Danwon-gu (KR); Kwang Sik Kim, Gunpo-si (KR)

(73) Assignee: Molex, LLC, Lisle, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/848,925

(22) Filed: Jun. 24, 2022

(65) Prior Publication Data

US 2022/0320774 A1 Oct. 6, 2022

Related U.S. Application Data

(63) Continuation of application No. 17/082,491, filed on Oct. 28, 2020, now Pat. No. 11,404,807, which is a (Continued)

(30) Foreign Application Priority Data

May 24, 2018 (KR) ........................ 10-2018-0059171
Jul. 5, 2018 (KR) ........................ 10-2018-0078338

(51) Int. Cl.
*H01R 12/73* (2011.01)
*H01R 12/57* (2011.01)

(Continued)

(52) U.S. Cl.
CPC ........... *H01R 12/716* (2013.01); *H01R 12/57* (2013.01); *H01R 12/7005* (2013.01);

(Continued)

(58) Field of Classification Search
CPC ............ H01R 13/6587; H01R 13/6585; H01R 13/6594; H01R 13/6581; H01R 13/6593; H01R 24/50
See application file for complete search history.

(56) References Cited

U.S. PATENT DOCUMENTS 5,387,130 A * 2/1995 Fedder ............... H01R 13/6594 439/701
6,056,560 A 5/2000 Wu (Continued)

FOREIGN PATENT DOCUMENTS

CN 201364991 Y 12/2009
CN 201690009 U 12/2010

(Continued)

OTHER PUBLICATIONS

Decision to grant for KR application No. 10-2018-0078338 dated Aug. 28, 2019, 2 pages (1 page of English translation and 1 page of official copy).

(Continued)

*Primary Examiner* — Truc T Nguyen

(57) ABSTRACT

A receptacle connector having a stable contact point structure and a rigid structure, and a connector assembly including the same, is provided. The receptacle connector includes a receptacle housing, a plurality of receptacle terminals which are retained and supported in the receptacle housing in a first direction, and one pair of receptacle metal members which are provided on both ends of the receptacle housing in the first direction.

20 Claims, 20 Drawing Sheets

Related U.S. Application Data continuation of application No. 16/351,529, filed on Mar. 13, 2019, now Pat. No. 10,868,378.

(51) Int. Cl.

| | |
|---|---|
| ***H01R 12/70*** | (2011.01) |
| ***H01R 12/71*** | (2011.01) |
| ***H01R 13/26*** | (2006.01) |
| ***H01R 13/504*** | (2006.01) |
| ***H01R 13/627*** | (2006.01) |
| ***H01R 27/00*** | (2006.01) |

(52) U.S. Cl.

CPC ............. *H01R 12/73* (2013.01); *H01R 13/26* (2013.01); *H01R 13/5045* (2013.01); *H01R 13/627* (2013.01); *H01R 27/00* (2013.01)

(56) References Cited

U.S. PATENT DOCUMENTS

| | | | | |
|---|---|---|---|---|
| 7,172,434 | B2 | 2/2007 | Obikane et al. | |
| 7,901,218 | B2 * | 3/2011 | Sato | H01R 13/20 439/74 |
| 8,845,339 | B2 * | 9/2014 | Ono | H01R 12/73 439/74 |
| 9,397,423 | B2 | 7/2016 | Suzuki et al. | |
| 9,728,882 | B1 | 8/2017 | Nakazawa | |
| 10,249,969 | B2 * | 4/2019 | Ono | H01R 13/504 |
| 11,139,601 | B2 * | 10/2021 | Meng | H01R 13/6594 |
| 2008/0214051 | A1 | 9/2008 | Obikane | |
| 2014/0120780 | A1 | 5/2014 | Nishimura | |
| 2015/0079816 | A1 | 3/2015 | Suzuki | |
| 2015/0132985 | A1 | 5/2015 | Choi | |
| 2015/0263464 | A1 | 9/2015 | Arichika | |
| 2016/0036145 | A1 | 2/2016 | Hasegawa | |
| 2016/0315430 | A1 * | 10/2016 | Takeuchi | H01R 12/707 |
| 2017/0005423 | A1 | 1/2017 | Takenaga et al. | |
| 2017/0054258 | A1 * | 2/2017 | Little | H01R 13/6275 |
| 2017/0264048 | A1 | 9/2017 | Ashibu | |
| 2018/0175561 | A1 | 6/2018 | Chen | |
| 2018/0183168 | A1 | 6/2018 | Sugaya | |
| 2018/0198241 | A1 | 7/2018 | Ooi | |
| 2018/0331444 | A1 | 11/2018 | Ono | |
| 2019/0165513 | A1 | 5/2019 | Tanaka et al. | |
| 2019/0372250 | A1 | 12/2019 | Takeuchi | |
| 2019/0379156 | A1 | 12/2019 | Aoki | |
| 2020/0395704 | A1 * | 12/2020 | Hosoda | H01R 24/60 |
| 2021/0356137 | A1 | 11/2021 | Bayerlein et al. | |

FOREIGN PATENT DOCUMENTS

| | | | |
|---|---|---|---|
| CN | 103050805 | A | 4/2013 |
| CN | 205178062 | U | 4/2016 |
| CN | 106058516 | A | 10/2016 |
| CN | 206059842 | U | 3/2017 |
| JP | 2013232386 | A | 11/2013 |
| JP | 5369207 | B2 | 12/2013 |
| JP | 2015185541 | A | 10/2015 |
| JP | 2016195056 | A | 11/2016 |
| JP | 6178395 | B2 | 8/2017 |
| JP | 2018018838 | A | 2/2018 |
| KR | 20130111318 | A | 10/2013 |
| KR | 20150075029 | A | 7/2015 |
| KR | 101658121 | B1 | 9/2016 |
| KR | 101687475 | B1 | 12/2016 |
| KR | 101745466 | B1 | 6/2017 |

OTHER PUBLICATIONS

Notice of allowance received for U.S. Appl. No. 17/082,491, dated Apr. 6, 2022, 8 pages.

Office action received for U.S. Appl. No. 17/082,491, dated Nov. 24, 2021, 7 pages.

* cited by examiner

RECEPTACLE CONNECTOR AND CONNECTOR ASSEMBLY INCLUDING THE SAME

RELATED APPLICATIONS

This application is a continuation of U.S. application Ser. No. 17/082,491, filed Oct. 28, 2020, which is a continuation of U.S. application Ser. No. 16/351,529, filed on Mar. 13, 2019, which issued as U.S. Pat. No. 10,868,378 on Dec. 15, 2020, which claims priority to Korean Divisional Application No. 10-2018-0078338, filed on Jul. 5, 2018, which issued as Korean Patent No. 10-2041368 on Oct. 31, 2019, which, in turn, claims priority to Korean Application No. 10-2018-0059171, filed May 24, 2018, which was abandoned, each of which are incorporated herein by reference in their entirety.

TECHNICAL FIELD

The present disclosure relates to a receptacle connector which is used to connect substrates, and a connector assembly including the same.

BACKGROUND ART

As electronic products are miniaturized, components mounted therein become slimmer and smaller. For example, a board-to-board (BTB) connector may be mounted in a smartphone or a digital camera to electrically connect substrates. As smartphones or digital cameras are miniaturized, a receptacle connector forming the BTB connector and a plug connector engaged therewith become slimmer to have an ultra-narrow width of a few millimeters.

The substrate having the receptacle connector mounted thereon, and the substrate having the plug connector mounted thereon may be repeatedly connected or disconnected by an operator when the smartphone or digital camera is repaired. However, the receptacle connector and the plug connector are so small that the receptacle connector and the plug connector are not aligned and are assembled in contact with each other out of position when the substrates are connected. When a force for assembling or an external shock is applied to the receptacle connector and the plug connector which are in contact with each other out of position, that is, in a misalignment state, there are problems that a contact portion between the receptacle connector and the plug connector may be easily deformed or damaged, and terminals retained and supported by the receptacle connector and the plug connector, respectively, may be easily deformed.

A BTB connector provided with metal pieces disposed on ends of the receptacle connector and the plug connector has been suggested to solve the above-mentioned problems. In this regard, Korean Laid-Open Patent Publication No. 10-2013-0111318 discloses an example of a connector assembly including a receptacle connector provided with a lock metal piece, and a plug connector provided with a counterpart lock metal piece which is inserted into and removed from the lock metal piece. According to the above-mentioned document, the lock metal piece includes a protrusion-shaped lock portion to prevent the counterpart lock metal piece inserted thereinto from being released therefrom, and the counterpart lock metal piece includes a recess portion to allow the lock portion to be locked thereinto.

SUMMARY

However, the lock metal piece of the receptacle connector and the counterpart lock metal piece of the plug connector, disclosed in the Korean Laid-Open Patent Publication No. 10-2013-0111318, may be prevented from being released from each other when they are inserted, but do not have a structure capable of guiding the receptacle connector and the plug connector contacting in the misalignment state to be normally engaged and assembled with each other. When the receptacle connector and the plug connector are assembled in contact with each other in the misalignment state, a deformation of the lock portion may be caused and thus there may be instability of a terminal contact point, causing poor contact between a terminal of the receptacle connector and a terminal of the plug connector. In addition, the lock metal piece provided on the receptacle connector according to the above-mentioned document does not include a structure capable of surrounding a portion protruding from the center of a receptacle housing retaining and supporting terminals, that is, a protruding wall, in the above-mentioned document. Therefore, an end of the protruding wall which may be easily deformed and damaged when the receptacle connector and the plug connector are assembled may not be protected. Due to these problems, the related-art BTB connector has difficulty in guaranteeing reliability of product performance, and there is a limit to meeting customers' wants.

Embodiments of the present disclosure solve the problems of the related-art technology, and provide a receptacle connector which has a stable contact point structure and a reinforced structure due to the presence of metal members over-molded on both ends of a housing, and a BTB connector assembly including the same.

One aspect of the present disclosure provides embodiments of a receptacle connector of a BTB connector. A receptacle connector according to exemplary embodiments includes: a receptacle housing which includes: a receptacle bottom; a receptacle surrounding portion protruding from an edge of the receptacle bottom; and a center protrusion arranged within the receptacle surrounding portion, the receptacle housing having an alignment recess formed between the receptacle surrounding portion and the center protrusion; a plurality of receptacle terminals which are retained and supported in the receptacle housing in a first direction; and one pair of receptacle metal members which are provided on both ends of the receptacle housing in the first direction. The receptacle surrounding portion may include: one pair of first surrounding portions which extend in the first direction and face each other in a second direction substantially orthogonal to the first direction; and one pair of second surrounding portions which extend in the second direction and face each other in the first direction. The receptacle metal member may include: a base portion which covers an upper surface of the receptacle bottom on each of both ends of the receptacle housing; one pair of first reinforcement portions which cover respective inner surfaces, upper surfaces, and outer surfaces of the one pair of first surrounding portions; a second reinforcement portion which covers an inner surface, an upper surface, and an outer surface of the second surrounding portion; and a third reinforcement portion which covers an outer surface and an upper surface of the center protrusion on an end of the center protrusion. The one pair of first reinforcement portions may be connected to the base portion to face each other in the second direction, and the second reinforcement portion and the third reinforcement portion are connected to the base portion to face each other in the first direction.

In one embodiment, the plurality of receptacle terminals and the one pair of receptacle metal members may be formed with a conductive material, and the plurality of receptacle terminals and the one pair of receptacle metal members may be over-molded over an insulation material which is injected into a mold and molded into the receptacle housing.

In one embodiment, a length of the first surrounding portion may be longer than a length of the second surrounding portion. The plurality of receptacle terminals may be retained and supported in the receptacle housing in two rows by the one pair of first surrounding portions.

In one embodiment, each of the one pair of first reinforcement portions may include a first inner surface portion extending from the base portion and provided with a contact piece elastically deformed by being pressed in the second direction.

In one embodiment, each of the one pair of first reinforcement portions may include a first upper surface portion extending from an upper edge of the first inner surface portion in the second direction, and a first outer surface portion extending downwardly from the first upper surface portion to face the first inner surface portion. The second reinforcement portion may include a second inner surface portion extending from the base portion toward the center protrusion in the first direction, a second upper surface portion extending from an upper edge of the second inner surface portion in the first direction, and a second outer surface portion extending downwardly from the second upper surface portion to face the second inner surface portion. The third reinforcement portion may include a third outer surface portion extending from the base portion to face the second inner surface portion in the first direction, and a third upper surface portion extending from an upper edge of the third outer surface portion in the first direction.

In one embodiment, the contact piece may include a fixed end connected to an edge of the base portion in the second direction, and a free end bent upwardly from the fixed end and extending therefrom. A receiving hole may be formed on the first inner surface portion to receive a portion of the contact piece when the contact piece is pressed toward the first outer surface portion in the second direction, and a receiving recess may be formed on the first surrounding portion in the second direction of the receiving hole to be connected with the receiving hole.

In one embodiment, the receiving hole may be extended up to the first inner surface portion and an inner edge portion contacting the first upper surface portion, and the inner edge portion may include an inclined surface downwardly inclining toward the base portion.

In one embodiment, the third outer surface portion may extend to be inclined with respect to the base portion.

In one embodiment, each of the first upper surface portion and the second upper surface portion may be arranged to be higher than the third upper surface portion with reference to the base portion.

In one embodiment, the receptacle metal member may include a first bending portion bent from a lower end of the first outer surface portion toward the first inner surface portion, and a second bending portion bent from a lower end of the second outer surface portion toward the second inner surface portion. The first bending portion may be arranged to be lower than the base portion, and the second bending portion may be arranged to be higher than the base portion.

In one embodiment, the receptacle metal member may further include a third bending portion bent from a lower end of the first outer surface portion in the opposite direction of the direction facing the first inner surface portion, and a fourth bending portion bent from a lower end of the second outer surface portion in the opposite direction of the direction facing the second inner surface portion. The third bending portion and the fourth bending portion may be arranged to be lower than the base portion.

In one embodiment, the receptacle metal member may include one pair of carrier connection portions arranged on both ends of the second upper surface portion in the second direction, and extending from an upper end of the second inner surface portion in the first direction.

In one embodiment, the receptacle housing may include a reinforcement rib protruding between the plurality of receptacle terminals.

Another aspect of the present disclosure provides embodiments of a connector assembly. A connector assembly according to exemplary embodiments includes a receptacle connector and a plug connector which are assembled by being press-fitted into each other. The receptacle connector may include: a receptacle housing which includes: a receptacle bottom; a receptacle surrounding portion protruding from an edge of the receptacle bottom; and a center protrusion arranged within the receptacle surrounding portion, the receptacle housing having an alignment recess formed between the receptacle surrounding portion and the center protrusion; a plurality of receptacle terminals which are retained and supported in the receptacle housing in a first direction; and one pair of receptacle metal members which are disposed on both ends of the receptacle housing in the first direction, and surround an upper surface of the receptacle bottom on both ends of the receptacle housing, an inner surface, an upper surface, and an outer surface of the receptacle surrounding portion, and an outer surface and an upper surface of the center protrusion on an end of the center protrusion. The plug connector may include: a plug housing including a plug bottom, and a plug surrounding portion protruding from an edge of the plug bottom to be press-fitted into the alignment recess; a plurality of plug terminals which are retained and supported in the plug housing in the first direction; and one pair of plug metal members which are arranged on both ends of the plug housing in the first direction, and surround inner surfaces, lower surfaces, and outer surfaces of the plug surrounding portion on both ends of the plug housing, respectively. The receptacle metal member may include one pair of inner surface portions which cover the inner surfaces of the receptacle surrounding portion facing each other in a second direction substantially orthogonal to the first direction, and a contact piece may be provided on each of the one pair of inner surface portions to be elastically deformed by being pressed by the plug metal member which is press-fitted into the alignment recess.

In one embodiment, the receptacle metal member may include an outer surface portion to cover an outer surface of an end of the center protrusion facing the first direction, and the outer surface portion of the receptacle metal member may be inclined with respect to the upper surface of the receptacle bottom.

In one embodiment, the plug metal member may include an outer surface portion to cover an outer surface of the outer surfaces of the plug surrounding portion that faces the first direction. A penetrating hole may be formed on the outer surface portion of the plug metal member, and the plug housing may include a protrusion which protrudes through the penetrating hole, and is brought into contact with the receptacle metal member when the plug metal member is press-fitted into the alignment recess in the receptacle metal member.

Advantageous Effects

According to embodiments of the present disclosure, both ends of the receptacle connector and the plug connector are protected by metal members over-molded over both ends of the housing. In particular, in the receptacle connector, the metal members over-molded over both ends of the housing are configured to have a secure support structure surrounding three surfaces (an inner surface, an upper surface extending from the inner surface, and an outer surface extending from the upper surface to face the inner surface) of the surrounding portion surrounding the center protrusion, and surrounding an outer surface and an upper surface of the center protrusion. Accordingly, the stiffness of the receptacle connector and the plug connector can be enhanced, and a deformation or damage can be prevented when the receptacle connector and the plug connector are assembled. In addition, the receptacle metal member has the outer surface portion inclined with respect to the upper surface of the receptacle bottom, and is configured to have a structure capable of guiding the plug connector to be aligned with the receptacle connector when the receptacle connector and the plug connector are assembled. Therefore, the receptacle connector and the plug connector can be prevented from being assembled in contact with each other in a misalignment state. Accordingly, a deformation or damage of the receptacle connector and the plug connector caused by misassembly of the receptacle connector and the plug connector can be prevented, and a deformation of a terminal can be prevented. The receptacle connector and the plug connector described above, and the connector assembly including the same can have reliable product performance.

DETAILED DESCRIPTIONS OF THE PREFERRED EMBODIMENTS

Figure 1:
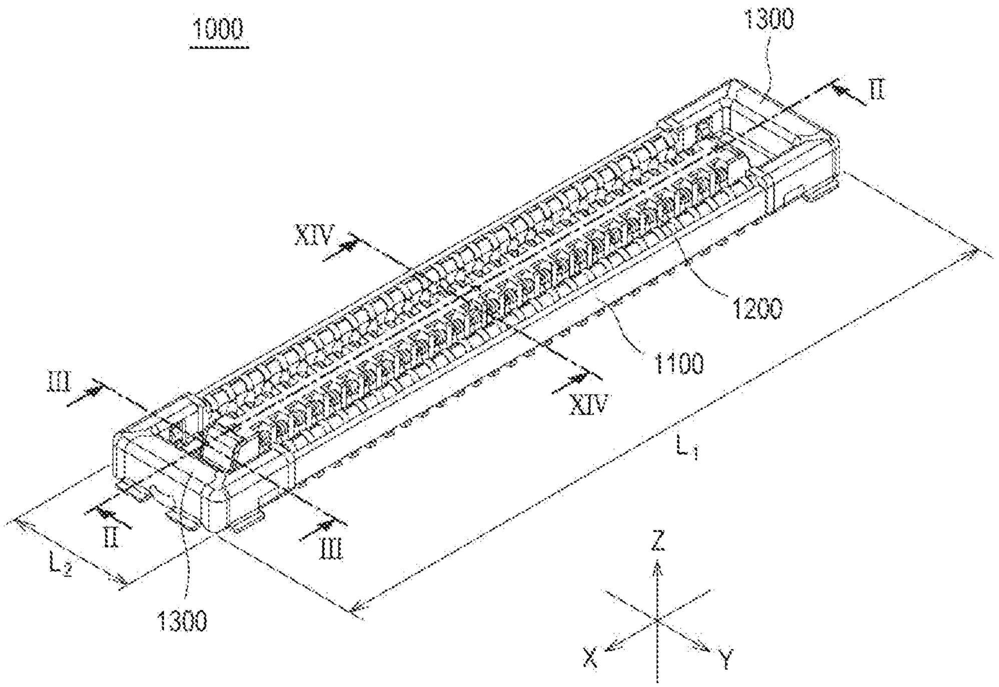
FIG. 1 is a perspective view illustrating a receptacle connector according to one embodiment of the present disclosure.

Embodiments of the present disclosure are exemplified for the purpose of describing the technical idea of the present disclosure. The right scope according to the present disclosure are not limited to embodiments suggested hereinbelow or detailed descriptions of these embodiments.

All of the technical terms and the scientific terms used in the present disclosure have the same meanings as those generally understood by an ordinary skilled person in the related art unless they are defined otherwise. All of the terms used in the present disclosure are selected for the purpose of describing the present disclosure more clearly, and are not selected to limit the right scope according to the present disclosure.

The terms "include," "comprise," "have," or the like used in the present disclosure should be understood as open-ended terms implying the possibility of including other embodiments unless otherwise indicated in phrases or sentences including these terms.

The singular forms used in the present disclosure are intended to include the plural forms as well, unless the context clearly indicates otherwise. The same is applied to the singular forms described in the claims.

The term such as "first" and "second" used in the present disclosure are used to distinguish a plurality of elements from one another, and do not limit an order or importance of the corresponding elements.

It should be understood that when an element is "connected with" or "coupled to" another element, the element may be directly connected with or coupled to another element, or the element may be connected with or coupled to another element via another new element.

Hereinafter, embodiments of the present disclosure will be described with reference to the accompanying drawings. In the accompanying drawings, the same reference numerals are assigned to the same or corresponding elements. In addition, in the following description of embodiments, a redundant description of the same or corresponding elements will be omitted. However, even if a description of an element is omitted, it is not intended to imply that the element is not included in a certain embodiment.

A connector assembly including a receptacle connector and a plug connector according to embodiments of the present disclosure may be referred to as a BTB connector of a vertical stacking structure. In addition, the receptacle connector may be referred to as a "female connector," and the plug connector may be referred to as a "male connector" which is assembled with (secured to) or disassembled from (removed from) the receptacle connector.

In the description of embodiments, it is illustrated that the receptacle connector and the plug connector are assembled in the vertical direction with reference to an arrangement in the accompanying drawings, but this should not be considered as limiting. The receptacle connector and the plug connector may be oriented in different directions on the drawings, and in this case, the receptacle connector and the plug connector may be assembled in other directions than the vertical direction.

FIG. 1 is a perspective view illustrating a receptacle connector 1000 according to one embodiment of the present disclosure.

Referring to FIG. 1, the receptacle connector 1000 of the one embodiment includes a receptacle housing 1100 extending in a first direction (X direction), a plurality of receptacle terminals 1200 retained and supported by the receptacle housing 1100 and aligned in two rows in the first direction (X direction), and one pair of receptacle metal members 1300 disposed on both ends of the receptacle housing 1100 in the first direction (X direction). The receptacle connector 1000 may be mounted on a substrate (for example, a printed circuit board) by surface mounting technology (SMT).

The plurality of receptacle terminals 1200 may be formed with a conductive material, for example, a copper alloy or the like, so as to be able to transmit signals. In addition, the one pair of receptacle metal members 1300 may be formed with a conductive material, for example, a copper alloy or the like, so as to be able to supply power. The plurality of receptacle terminals 1200 and the one pair of receptacle metal members 1300 may be plated to enhance conductivity and an anti-rust property.

The plurality of receptacle terminals 1200 and the one pair of receptacle metal members 1300 may be over-molded or full over-molded over an insulation material which is injected into a mold and is molded into the receptacle housing 1100. The insulation material molded into the receptacle housing 1100 may include plastic, a heat-resistant resin, or the like having a heat-resisting property. Over-molding refers to an injection molding method by which different materials (components) are molded altogether. While the insulation material is molded into the receptacle housing 110 in the mold, at least a portion of the insulation material fills the plurality of receptacle terminals 1200 and the one pair of receptacle metal members 1300, such that the receptacle housing 1100, the plurality of receptacle terminals 1200, and the one pair of receptacle metal members 1300 are integrally formed with one another. The receptacle connector 1000 manufactured by over-molding are easier to manufacture than a receptacle connector which is integrally assembled after a receptacle housing, a plurality of receptacle terminals, and one pair of receptacle metal members are individually manufactured, and has an advantage of having a secure structure.

The receptacle connector 1000 has a symmetrical structure with respect to a plane which is defined in the first direction (X direction) and the vertical direction (Z direction), and passes through the center of the receptacle connector 1000 in a second direction (Y direction). In addition, the receptacle connector 1000 has a symmetrical structure with respect to a plane which is defined in the second direction (Y direction) and the vertical direction (Z direction), and passes through the center of the receptacle connector 1000 in the first direction (X direction). Herein, the second direction (Y direction) refers to a direction which is orthogonal to both the first direction (X direction) and the vertical direction (Z direction). The plane defined in the first direction (X direction) and the vertical direction (Z direction) is an XZ plane, and the plane defined in the second direction (Y direction) and the vertical direction (Z direction) is a YZ plane.

Figure 2:
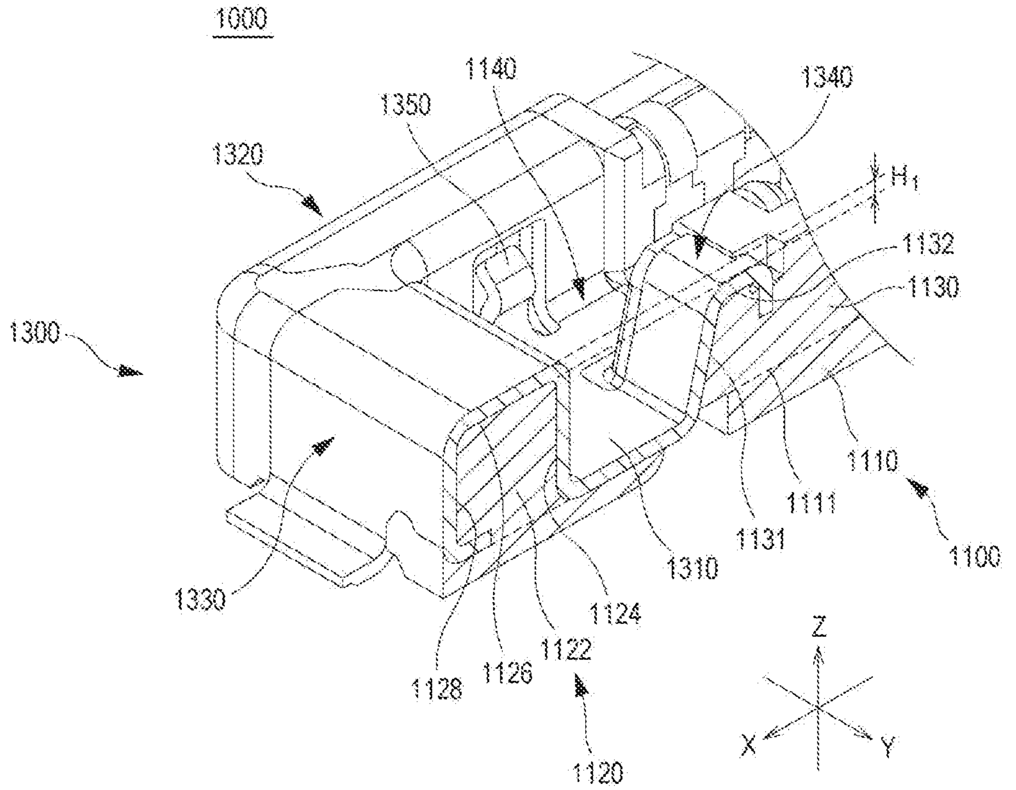
FIG. 2 is a view illustrating a portion of the receptacle connector including a cutaway surface taken on line II-II of FIG. 1.
Figure 3:
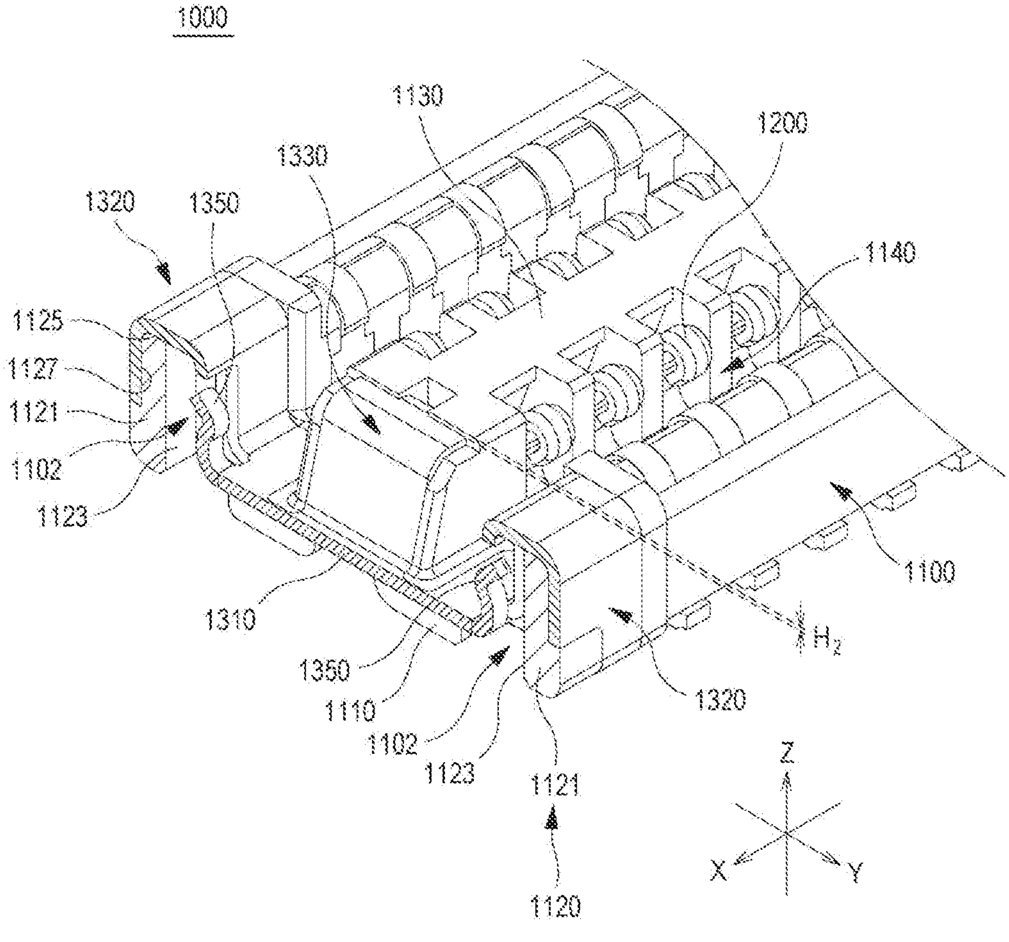
FIG. 3 is a view illustrating a portion of the receptacle connector including a cutaway surface taken on line of FIG. 1.

FIG. 2 is a view illustrating a portion of the receptacle connector 1000 including a cutaway surface taken on line II-II of FIG. 1, and FIG. 3 is a view illustrating a portion of the receptacle connector 1000 including a cutaway surface taken on line of FIG. 1.

Referring to FIGS. 2 and 3, the receptacle housing 1100 of the one embodiment includes a receptacle bottom 1110, a receptacle surrounding portion 1120 protruding upwardly (hereinafter, a direction indicated by the arrow of the Z direction) from an edge of the receptacle bottom 1110, and a center protrusion 1130 (referred to as a "protrusion," "island portion," or "island forming portion") arranged in the receptacle surrounding portion 1120.

As shown in FIG. 1, the receptacle housing 1100 may have a substantially cuboidal shape having an upper portion opened and a center portion recessed, or a similar shape thereto. That is, the receptacle surrounding portion 1120 in the receptacle housing 1100 includes one pair of first surrounding portions 1121 extending in the first direction (X direction) and facing each other in the second direction (Y direction), and one pair of second surrounding portions 1122 extending in the second direction (Y direction) and facing each other in the first direction (X direction). The one pair of first surrounding portions 1121 may extend in parallel in the first direction (X direction), and the one pair of second surrounding portions 1122 may extend in parallel in the second direction (Y direction). A length $L_1$ of the first surrounding portion 1121 extending in the first direction (X direction) is longer than a length $L_2$ of the second surrounding portion 1122 extending in the second direction (Y direction) (see FIG. 1).

The center protrusion 1130 may be positioned on and protrude from an upper surface 1111 of the receptacle bottom 1110 to have an island shape isolated from the receptacle surrounding portion. That is, the center protrusion 1130 may be spaced apart from the receptacle surrounding portion 1120 both in the first direction (X direction) and the second direction (Y direction). An alignment recess 1140 may be formed between the receptacle surrounding portion 1120 and the center protrusion 1130, and a portion of a plug connector 2000 (see FIG. 16 and FIGS. 19 to 21) may be press-fitted into the alignment recess 1140 when the receptacle connector 1000 and the plug connector 2000 are assembled. When the receptacle connector 1000 is viewed from above, the alignment recess 1140 may have a rectangular shape or a similar shape thereto.

The receptacle metal member 1300 may be referred to as a metal piece which can protect ends of the receptacle housing 110 from an external shock. In the one embodiment, the receptacle metal member 1300 includes a base portion 1310 to cover the upper surface 1111 of the receptacle bottom 1110 on an end of the receptacle housing 1100, one pair of first reinforcement portions 1320 to cover respective inner surfaces 1123, upper surfaces 1125, and outer surfaces 1127 of the one pair of first surrounding portions 1121 facing each other in the second direction (Y direction), and a second reinforcement portion 1330 to cover an inner surface 1124, an upper surface 1126, and an outer surface 1128 of the second surrounding portion 1122. In addition, the receptacle metal member 1300 includes a third reinforcement portion 1340 connected with the base portion 1310 to cover an outer surface 1131 and an upper surface 1132 of the center protrusion 1130 on the end of the center protrusion 1130. The inner surface 1123 of the first surrounding portion 1121 faces the center protrusion 1130 in the second direction (Y direction), and the inner surface 1124 of the second surrounding portion 1122 faces the center protrusion 1130 in the first direction (X direction). In addition, the outer surface 1127 of the first surrounding portion 1121 faces in the opposite direction of the direction facing the center protrusion 1130 in the second direction (Y direction), and the outer surface 1128 of the second surrounding portion 1122 faces in the opposite direction of the direction facing the center protrusion 1130 in the first direction (X direction).

Figure 4:
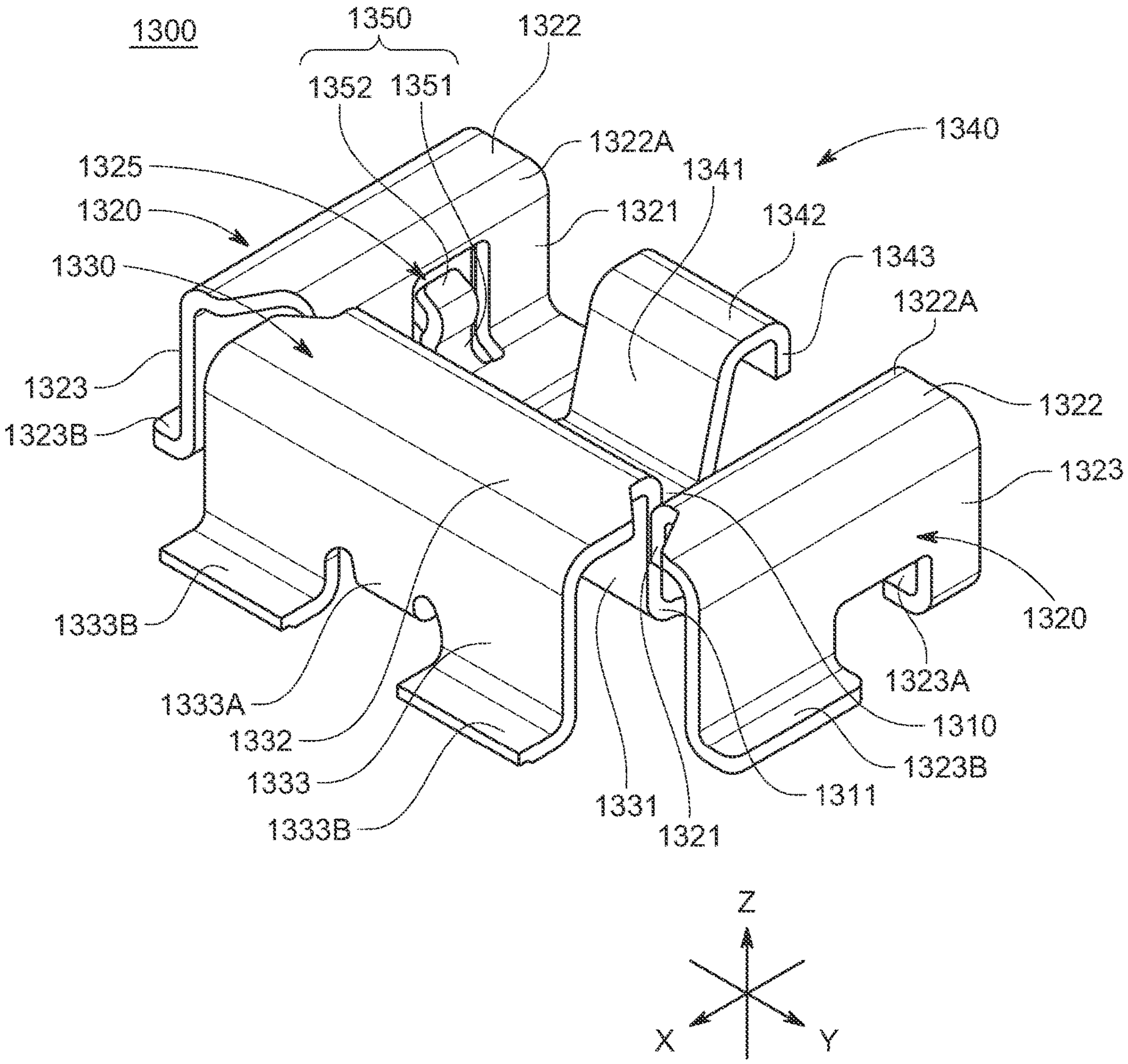
FIG. 4 is a perspective view illustrating a receptacle metal member according to an embodiment of the present disclosure.
Figure 5:
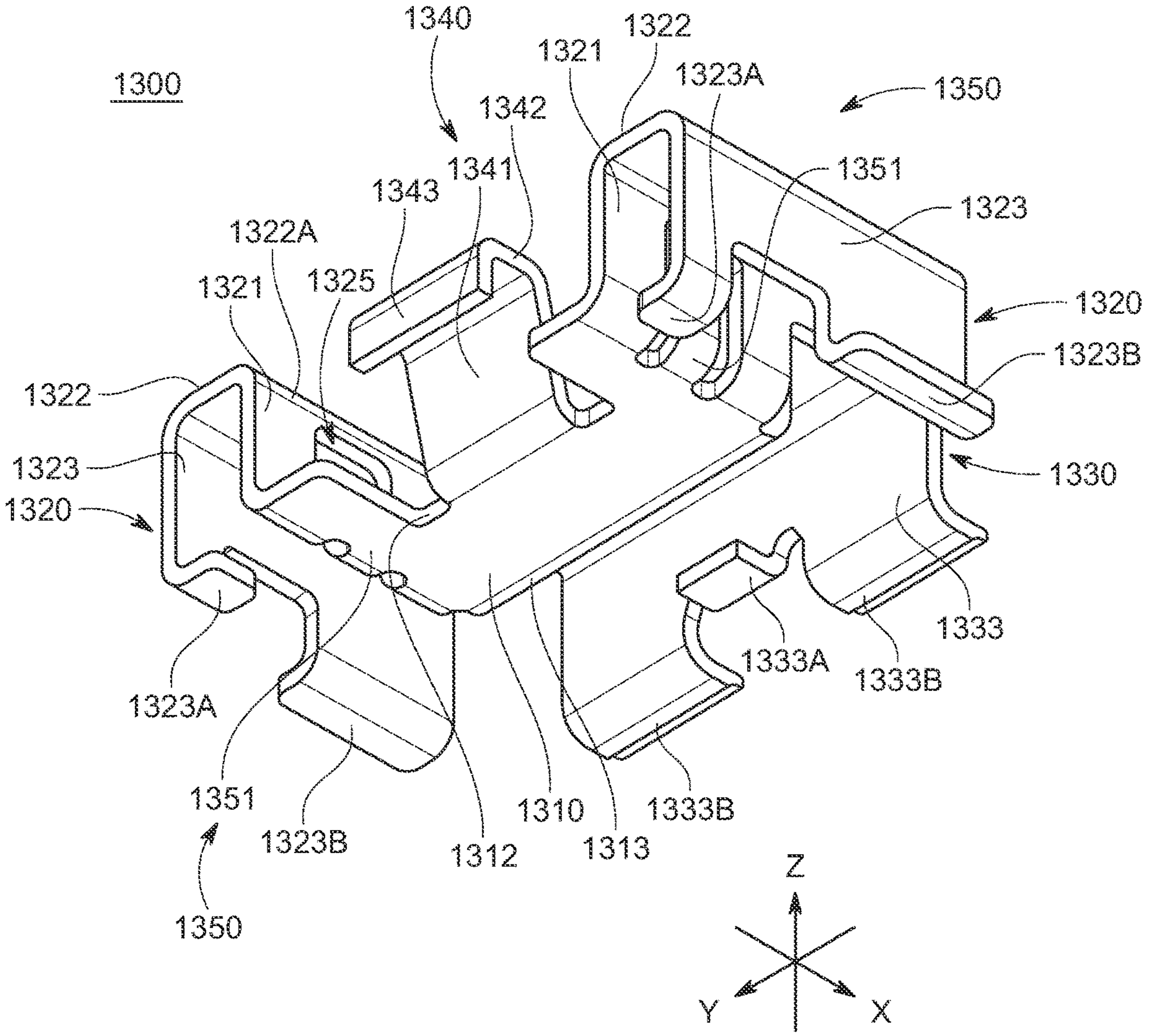
FIG. 5 is a perspective view of the receptacle metal member of FIG. 4 as seen from a different angle.

FIG. 4 is a perspective view illustrating the receptacle metal member 1300 according to the one embodiment, and FIG. 5 is a perspective view of the receptacle metal member 1300 of FIG. 4 as seen from a different angle.

Referring to FIGS. 4 and 5, the base portion 1310 in the receptacle metal member 1300 of the one embodiment has a plate shape to cover the receptacle bottom 1110 on the end of the receptacle housing 1100. The first reinforcement portion 1320 includes a first inner surface portion 1321, a first upper surface portion 1322, and a first outer surface portion 1323 to surround each of the one pair of first surrounding portions 1121 facing each other on the end of the receptacle housing 1100. The first inner surface portion 1321, the first upper surface portion 1322, and the first outer surface portion 1323 of the first reinforcement portion 1320, which continuously extend, surround the inner surface 1123, the upper surface 1125, and the outer surface 1127 of the first surrounding portion 1121.

The first inner surfaces portions 1321 extend upwardly from each of both outer side edges 1311, 1312 of the base portion 1310 in the third direction (Z direction). The outer side edge 1311 of the base portion 1310 defines a first outer side edge 1311, and the outer side edge 1312 of the base portion 1310 defines a second outer side edge 1312. The first upper surface portion 1322 extends from an upper edge of the first inner surface portion 1321 in the second direction (Y direction). The respective first inner surface portion 1321 is angled relative to the respective first upper surface portion 1322. The first outer surface portion 1323 extends downwardly from the first upper surface portion 1322 in the third direction (Z direction) to face the first inner surface portion 1321 in the second direction (Y direction). The respective first upper surface portion 1322 is angled relative to the respective first outer surface portion 1323. The first outer surface portion 1323 may be spaced further apart from the base portion 1310 than the first inner surface portion 1321. When the receptacle metal member 1300 is viewed from the first direction (X direction), the first inner surface portion 1321 and the first outer surface portion 1323 may extend in parallel with each other. An edge portion where the first inner surface portion 1321 and the first upper surface portion 1322 are connected, and an edge portion where the first upper surface portion 1322 and the first outer surface portion 1323 may be formed of curved surfaces, respectively.

The second reinforcement portion 1330 of the receptacle metal member 1300 has a structure surrounding the inner surface 1124, the upper surface 1126, and the outer surface 1128 of the second surrounding portion 1122 on the end of the receptacle housing 1100. That is, the second reinforcement portion 1330 includes a second inner surface portion 1331 extending from an outer end edge 1313 of the base portion 1310 that faces the first direction (X direction), a second upper surface portion 1332, and a second outer surface portion 1333. The second inner surface portion 1331 may be formed to extend upwardly from the base portion 1310. The second upper surface portion 1332 extends from an upper edge of the second inner surface portion 1331 in the first direction (X direction), and the second outer surface portion 1333 extends downward from the second upper surface portion 1332 to face the second inner surface portion 1331. The second outer surface portion 1333 facing the second inner surface portion 1331 in the first direction (X direction) may be spaced further apart from the base portion 1310 than the second inner surface portion 1331. The second reinforcement portion 1330 may have a structure in which the second upper surface portion 1332 extends from the second inner surface portion 1331 extending from the base portion 1310, and the second outer surface portion 1333 extends from the second upper surface portion 1332. Edge portions of the second upper surface portion 1332 which are connected with the second inner surface portion 1331 and the second outer surface portion 1333, respectively, may be formed of curved surfaces.

According to the above-described embodiment, the receptacle metal member 1300 may have a structure to surround an end of the center protrusion 1130, in addition to the structures surrounding some of the inner surfaces, the upper surfaces, and the outer surfaces of the receptacle housing 1100. That is, the receptacle metal member 1300 may include the third reinforcement portion 1340 to be able to surround an end of the center protrusion 1130, which is surrounded by the one pair of first surrounding portions 1121 and the second surrounding portion 1122 on the end of the receptacle housing 1100. In the one embodiment, the third reinforcement portion 1340 includes a third outer surface portion 1341 facing the second inner surface portion 1331 in the first direction (X direction), and a third upper surface portion 1342 extending from an upper end of the third outer surface portion 1341 in the first direction (X direction). The third outer surface portion 1341 and the third upper surface portion 1342 of the third reinforcement portion 1340 may surround the outer surface 1131 and the upper surface 1132 of the center protrusion 1130 on the end of the center protrusion 1130. The third reinforcement portion 1340 may further include a bending portion 1343 which is bent downward from one of both edges of the third upper surface portion 1342 in the first direction (X direction) that is opposite to the edge extending from the third outer surface portion 1341. When the receptacle metal member 1300 is over-molded to manufacture the receptacle connector 1000, the bending portion 1343 may be buried in the end of the center protrusion 1130.

The receptacle metal member 1300 having the one pair of first reinforcement portions 1320, the second reinforcement portion 1330, and the third reinforcement portion 1340 are configured to surround all of the surfaces of the receptacle surrounding portion 1120 facing the first direction (X direction), the second direction (Y direction), and the upward direction, and the surfaces of the center protrusion 1130 facing the first direction (X direction) and the upward direction. Therefore, the receptacle metal member 1300 can protects the ends of the receptacle connector 1000 from an external shock, and thus can prevent the ends of the receptacle connector 1000 from being deformed and damaged, and can enhance the stiffness of the receptacle connector 1000.

The receptacle connector 1000 of the one embodiment may be supplied with power from a plug metal member 2300 (see FIG. 16) provided in the plug connector 2000 through a contact point structure of the receptacle metal member 1300, which is brought into contact with the plug connector 2000 assembled with the receptacle connector 1000, or may supply power to the plug metal member 2300 provided in the plug connector 2000. The receptacle connector 1000 has one pair of contact pieces 1350 to be stably brought into contact with the plug connector 2000, as the contact point structure of the receptacle metal member 1300 to be brought into contact with the plug connector 2000. The contact piece 1350 may be provided on each of the one pair of first inner surface portions 1321, and may have a portion protruding toward the alignment recess 1140. Therefore, the contact piece 1350 may be elastically deformed (bent) by a force applied in the second direction (Y direction) (for example, by being pressed by contact with the plug connector assembled with the receptacle connector), and may return to its original state as the force applied in the second direction (Y direction) is removed.

The contact piece 1350 includes a fixed end 1351 connected to the edge of the base portion 1310 in the second direction (Y direction), and a free end 1352 extending upwardly from the fixed end 1351 and bent to have a convex portion facing the alignment recess 1140. A receiving hole 1325 penetrates to receive a portion of the contact piece 1350 to allow the contact piece 1350 to be deformed when the contact piece 1350 is subject to a force pressing in the second direction (Y direction). A portion of the first inner surface portion 1321 may be cut to form the receiving hole 1325, and the contact piece 1350 may be formed by deforming the portion cut in the first inner surface portion 1321.

A receiving recess 1102 (see FIG. 3) is formed on the first surrounding portion 1121 of the receptacle housing 1100 in the second direction (Y direction) of the receiving hole 1325 in the receptacle connector 1000. The contact piece 1350 may be elastically deformed to be bent by a large allowance angle with respect to the base portion 1310 due to the receiving hole 1325 and the receiving recess 1102 connected with the receiving hole 1325. Accordingly, the contact pieces 1350 are surely brought into contact with both sides of the plug connector 2000 assembled with the receptacle connector 1000 in the second direction (Y direction), and the plug connector 2000 brought into contact with the one pair of contact pieces 1350 may be supported by the one pair of contact pieces 1350 to be prevented from shaking in the alignment recess 1140 in the second direction (Y direction).

In the receptacle metal member 1300 of the one embodiment, the receiving hole 1325 is formed on the first inner surface portion 1321. Specifically, the receiving hole 1325 is formed only on the first inner surface portion 1321, and is not formed up to an inner edge portion 1322A where the first inner surface portion 1321 and the first upper surface portion 1322 are in contact with each other. The inner edge portion 1322A which has a rounded shape in cross section may include a half portion extending from the first inner surface portion 1321 and the other half portion extending from the half portion toward the first upper surface portion 1322. Accordingly, when the receptacle metal member 1300 is viewed from above, most of the contact piece 1350 is hidden by the first upper surface portion 1322 and is not exposed (see the A portion of FIG. 21). Accordingly, when the plug connector 2000 is placed in the vertical direction (Z direction) and is assembled with the receptacle connector 1000, the plug connector 2000 pressed down toward the receptacle connector 1000 does not contact the contact piece 1350 in the vertical direction (Z direction) by the inner edge portion 1322A extending from the first inner surface portion 1321 toward the first upper surface portion 1322, such that the contact piece 1350 can be prevented from being deformed (for example, dented downward) unintentionally by the plug connector 2000.

In the embodiment, since the third outer surface portion 1341 of the third reinforcement portion 1340 of the receptacle metal member 1300 is formed to be inclined with respect to the base portion 1310, the plug connector 2000 may be guided to the alignment recess 1140 and assembled in a desired position even when the plug connector 2000 starts to be assembled with the receptacle connector 1000 in a slight misalignment state. The third outer surface portion 1341 may be inclined to go further away from the second inner surface portion 1331 of the second reinforcement portion 1330 as the third outer surface portion 1341 goes up from the base portion 1310, such that the alignment recess 1140 between the third outer surface portion 1341 and the second inner surface portion 1331 has a shape becoming gradually thinner from the upper portion through which the plug connector 2000 is inserted toward the lower portion. Accordingly, the plug connector 2000 can be stably assembled with the receptacle connector 1000 without interference, and thus assembility and stability of an assembly position can be enhanced.

In the receptacle metal member 1300, the first upper surface portion 1322 of the first reinforcement portion 1320 and the second upper surface portion 1332 of the second reinforcement portion 1330 are arranged to be higher than the third upper surface portion 1342 of the third reinforcement portion 1340 with reference to the base portion 1310. That is, the third upper surface portion 1342 is arranged to have a difference $H_1$ in height (see FIG. 2) with respect to the first upper surface portion 1322 and the second upper surface portion 1332. Due to the difference $H_1$ in height, the plug metal member 2300 provided in the plug connector 2000 may be guided to be press-fitted into a space surrounded by the one pair of first surrounding portions 1121 and the second surrounding portion 1122 disposed between the one pair of first surrounding portions 1121 when the receptacle connector 1000 and the plug connector are assembled, and a shock can be prevented from being applied to the center protrusion 1130 positioned to be relatively low and thus a deformation or damage of the center protrusion 1130 can be prevented.

Meanwhile, there is a difference $H_2$ in height (see FIG. 3) between the third upper surface portion 1342 and the center protrusion 1130, that is, a distance difference in the vertical direction (Z direction) between the upper surface of the third upper surface portion 1342 and the upper surface of the center protrusion 1130, such that the plug connector 2000 assembled with the receptacle connector 1000 can be prevented from interfering with the receptacle housing 1100, and a damage to the receptacle housing 1100 can be prevented or minimized.

As shown in FIGS. 4 and 5, the receptacle metal member 1300 includes a first bending portion 1323A formed on a lower end of the first outer surface portion 1323 to be bent toward the first inner surface portion 1321. In addition, the receptacle metal member 1300 includes a second bending portion 1333A formed on a lower end of the second outer surface portion 1333 to be bent toward the second inner surface portion 1331. The first bending portion 1323A supports the receptacle bottom 1110 of the receptacle housing 1100, and simultaneously, functions as a soldering portion to be mounted on the substrate, and the second bending portion 1333A is buried in the receptacle housing 1100 during the over-molding process. By the first bending portion 1323A and the second bending portion 1333A, the receptacle metal member 1300 may be securely coupled to the receptacle housing 1100.

In addition, the receptacle metal member 1300 includes a third bending portion 1323B bent from a lower end of the first outer surface portion 1323 in the opposite direction of the direction facing the first inner surface portion 1321, and includes a fourth bending portion 1333B bent from a lower end of the second outer surface portion 1333 in the opposite direction of the direction facing the second inner surface portion 1331. The third bending portion 1323B and the fourth bending portion 1333*b* are arranged to be lower than the base portion 1310.

Figure 6:
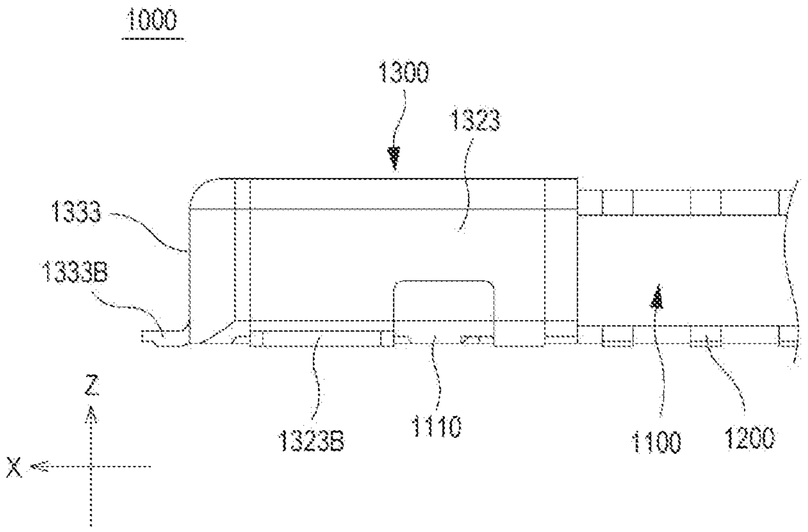
FIG. 6 is a side view illustrating a portion of the receptacle connector according to one embodiment of the present disclosure.

FIG. 6 is a side view illustrating a portion of the receptacle connector 1000 according to one embodiment of the present disclosure.

As shown in FIG. 6, the third bending portion 1323B and the fourth bending portion 1333B may be arranged to be lower than the receptacle bottom 1110 of the receptacle housing 1100. The third bending portion 1323B and the fourth bending portion 1333B may be soldered to the substrate to allow the receptacle connector 1000 to be mounted on the substrate, and in this case, the receptacle connector 1000 may be supported while being spaced apart from the surface of the substrate by the third bending portion 1323B and the fourth bending portion 1333B.

Figure 7:
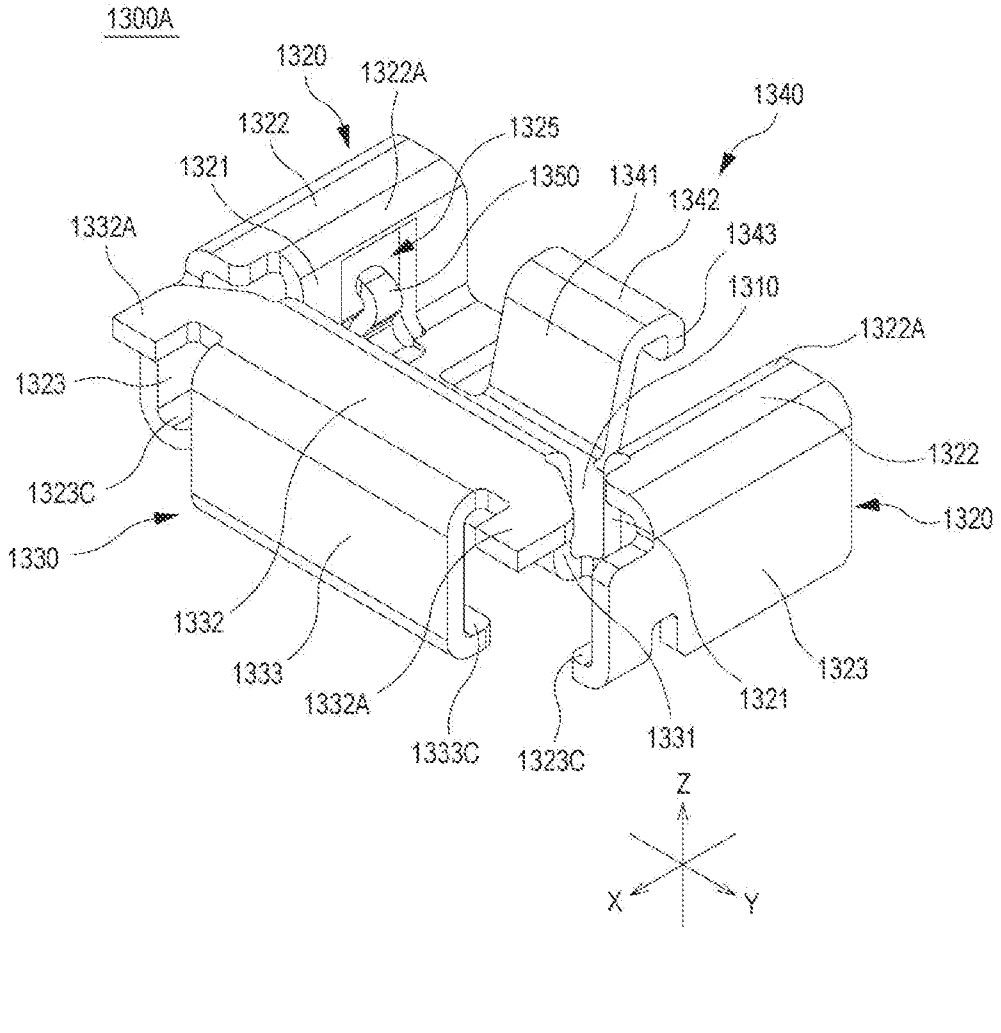
FIG. 7 is a perspective view illustrating a receptacle metal member according to another embodiment of the present disclosure.
Figure 8:
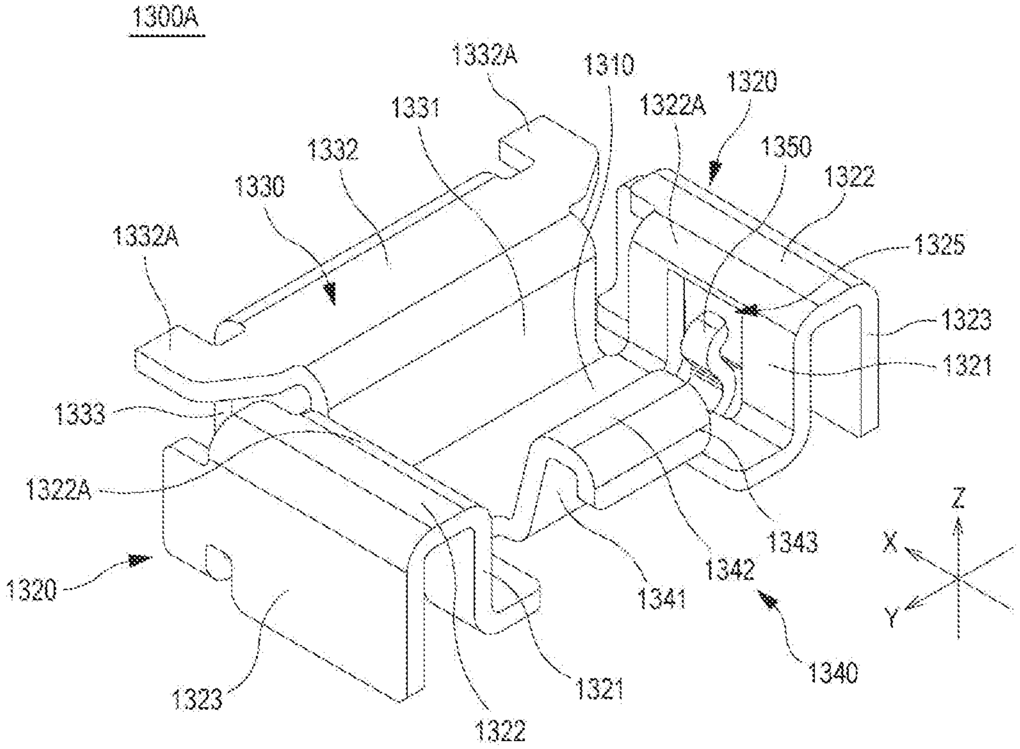
FIG. 8 is a perspective view of the receptacle metal member of FIG. 7 as seen from a different angle.
Figure 9:
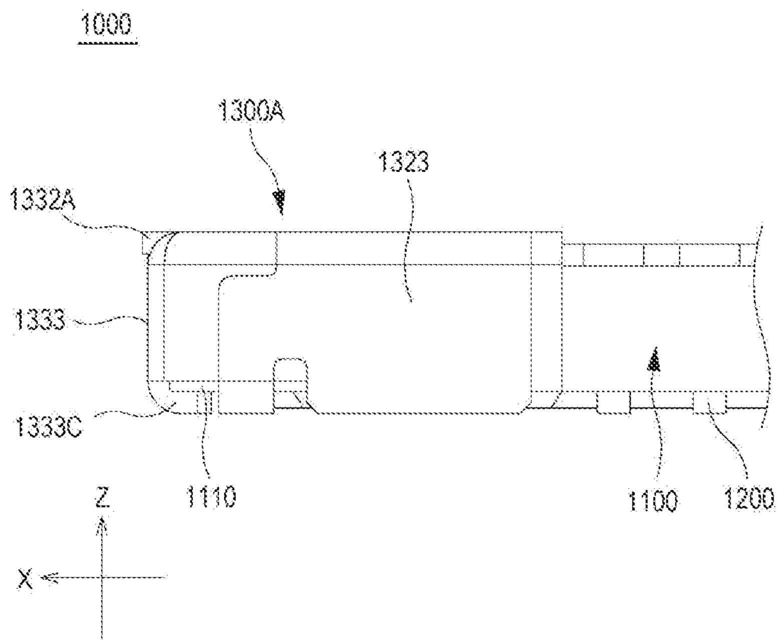
FIG. 9 is a side view illustrating a portion of the receptacle connector to which the receptacle metal member of FIG. 7 is applied.

FIG. 7 is a perspective view illustrating a receptacle metal member 1300A according to another embodiment of the present disclosure, and FIG. 8 is a perspective view of the receptacle metal member 1300A of FIG. 7 as seen from a different angle. In addition, FIG. 9 is a side view illustrating a portion of the receptacle connector 1000 to which the receptacle metal member 1300A illustrated in FIG. 7 is applied. Regarding the receptacle metal member 1300A illustrated in FIGS. 7 to 9, a structural difference from the receptacle metal member 1300 of the one embodiment will be highlighted.

Referring to FIGS. 7 to 9, the receptacle metal member 1300A includes a bending portion 1323C bent from a lower end of the first outer surface portion 1323 toward the base portion 1310, and a bending portion 1333C bent from a lower end of the second outer surface portion 1333 toward the base portion 1310. The bending portions 1323C, 1333C may support the receptacle bottom 1110 of the receptacle housing 1100 as shown in FIG. 9. The receptacle metal member 1300A may be mounted on the substrate by soldering the bending portions 1323C, 1333C to the substrate.

Compared with the receptacle metal member 1300 of the one embodiment, the receptacle metal member 1300A does not have a portion bent outward, that is, the third bending portion 1323B and the fourth bending portion 1333B of the receptacle metal member 1300, and thus a relatively small mounting area on the substrate may be required. Accordingly, the receptacle metal member 1300A can be easily mounted on a substrate of a compact size.

Compared with the second upper surface portion 1332 of the receptacle metal member 1300, the second upper surface portion 1332 of the receptacle metal member 1300A may have a plate shape divided into plural parts. That is, the second upper surface portion 1332 may include one pair of carrier connection portions 1332A arranged at both ends of the second upper surface portion 1332 in the second direction (Y direction), and extending from an upper end of the second inner surface portion 1331 in the first direction (X direction).

Figure 10:
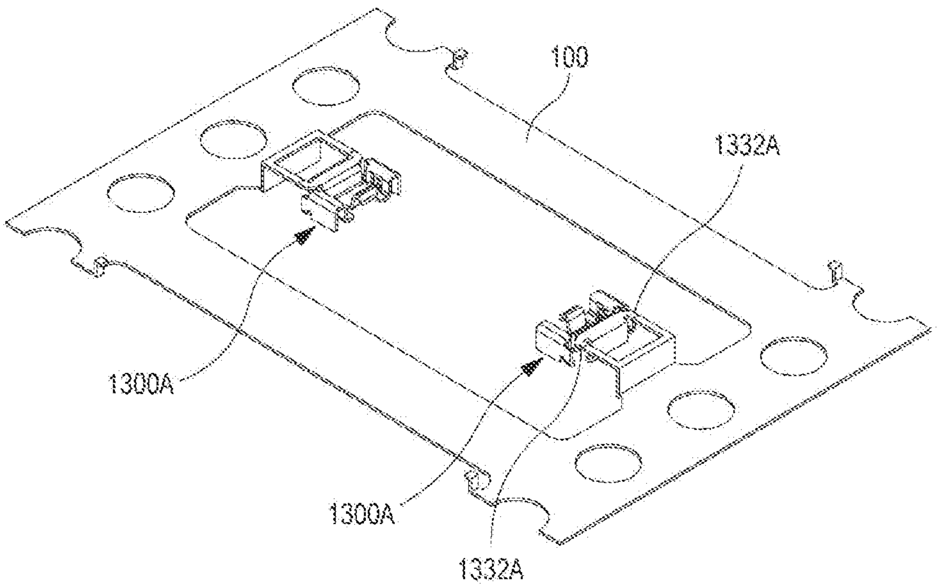
FIG. 10 is a view illustrating a base material plate to which the receptacle metal member of FIG. 7 is connected.

FIG. 10 is a view illustrating a base material plate 100 to which the receptacle metal member 1300A of FIG. 7 is connected.

As shown in FIG. 10, the receptacle metal member 1300A may be formed by processing one thin-film shaped plate 100 by cutting, bending, or the like. One pair of receptacle metal members 1300A may be formed on the base material plate 100. The one pair of receptacle metal members 1300A may be connected to the base material plate 100 on the same arrangement as that of the receptacle connector 1000, and in this case, the receptacle metal member 1300A may be kept being connected to the base material plate 100 by the one pair of carrier connection portions 1332A. When the receptacle connector 1000 is manufactured, the one pair of receptacle metal members 1300A being connected to the base material plate 100 may be inserted into a mold and may be over-molded, and may be separated from the base material plate 100 by cutting the carrier connection portions 1332A of each of the one pair of receptacle metal members 1300A after being over-molded. The receptacle metal member 1300 of the one embodiment may be formed from the thin-film shaped base material plate 100, and in this case, the receptacle metal member 1300 may be connected to the base material plate 100 by the fourth bending portion 1333B formed on the lower end of the second outer surface portion 1333.

Figure 11:
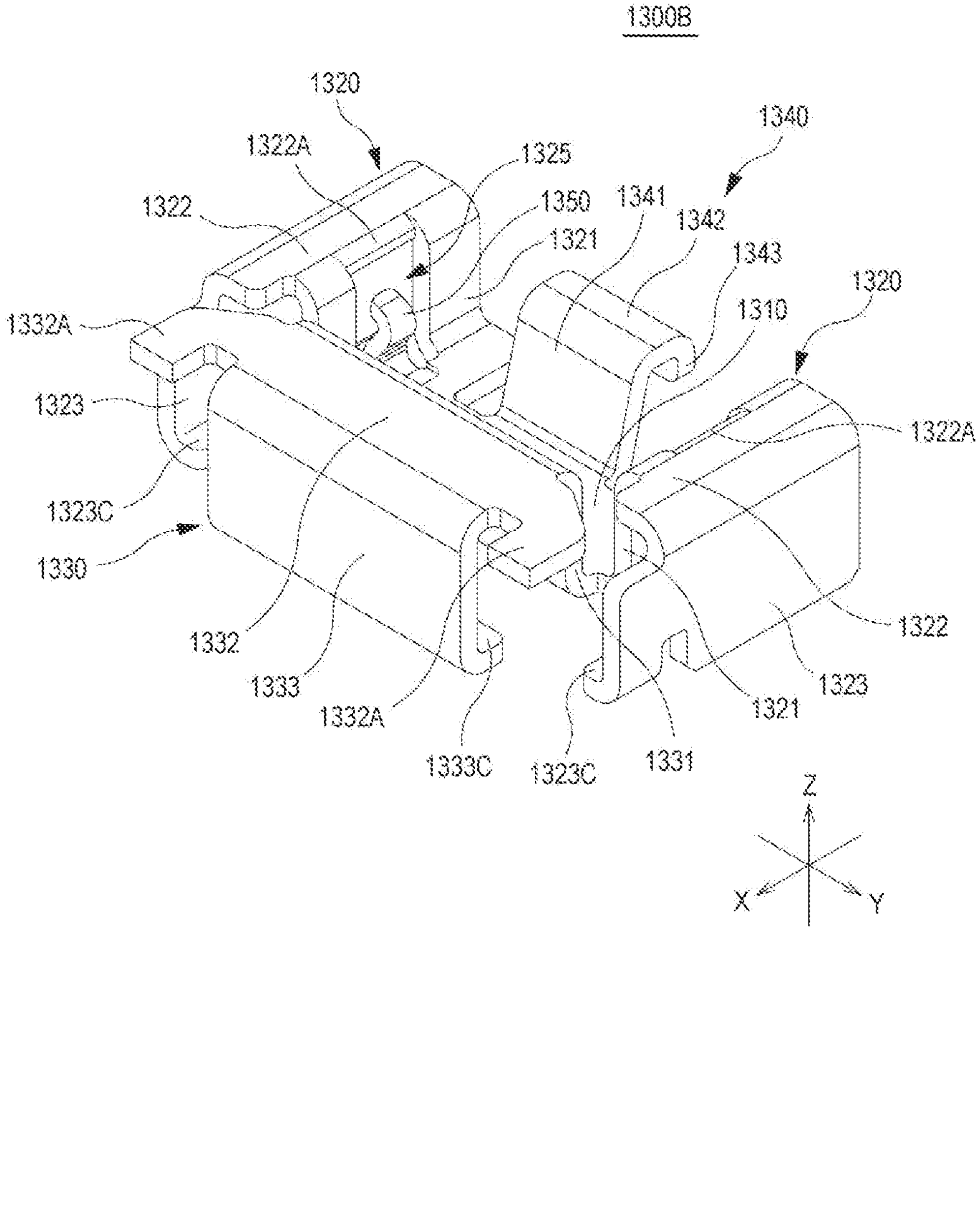
FIG. 11 is a perspective view illustrating a receptacle metal member according to still another embodiment of the present disclosure.
Figure 12:
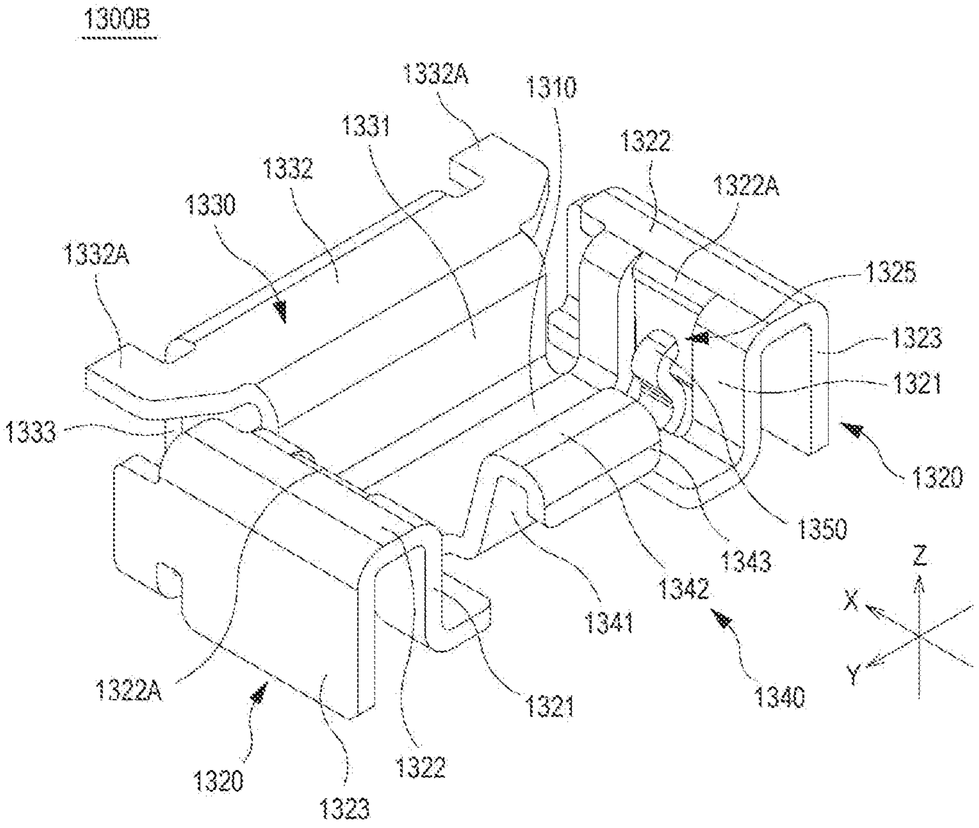
FIG. 12 is a perspective view of the receptacle metal member of FIG. 11 as seen from a different angle.

FIG. 11 is a perspective view illustrating a receptacle metal member 1300B according to still another embodiment of the present disclosure, and FIG. 12 is a perspective view of the receptacle metal member 1300B of FIG. 11 as seen from a different angle. In addition, FIG. 13 is a cutaway view illustrating the receptacle connector 1000 employing the receptacle metal member 1300B illustrated in FIG. 11.

Figure 13:
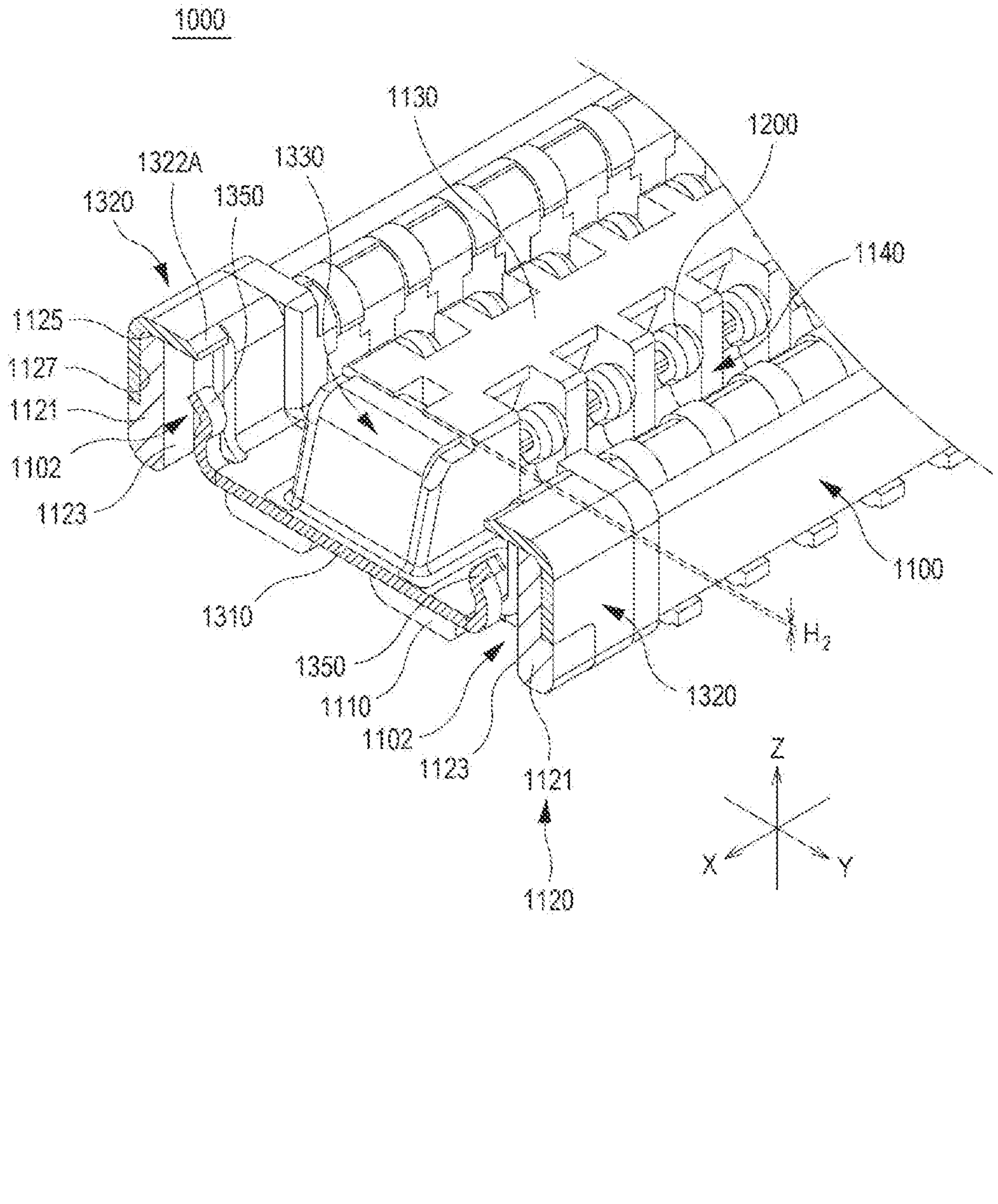
FIG. 13 is a cutaway view illustrating the receptacle connector employing the receptacle metal member of FIG. 11.

Referring to FIGS. 11 to 13, the receptacle metal member 1300B differs from the above-described receptacle metal member 1300A only in the structure forming the receiving hole 1325, and is the same in the other portions. In the receptacle metal member 1300B, the receiving hole 1325 in which the contact piece 1350 is disposed may be extended up to the first inner surface portion 1321 and the inner edge portion 1322A where the first inner surface portion 1321 and the first upper surface portion 1322 contact, so as to guarantee mass production while maintaining maximum stiffness of the receptacle metal member 1300B. For example, when the inner edge portion 1322A includes a half portion (first half portion) extending from the first inner surface portion 1321, and the other half portion (second half portion) extending from the half portion toward the first upper surface portion 1322, the receiving hole 1325 may be extended up to the first half portion extending from the first inner surface portion 1321. In addition, when the first half portion is cut to form the receiving hole 1325, the second half portion of the inner edge portion 1322A may include an inclined surface downwardly inclining toward the base portion 1310. The shape of the inner edge portion 1322A is not limited to the one embodiment. In another embodiment, the inner edge portion 1322A may have a curved surface formed on an upper portion thereof instead of the inclined surface.

Since the upper portion of the receiving hole 1325 is not completely opened by the inner edge portion 1322A in the case of the receptacle metal member 1300B, the contact piece 1350 may be partially hidden by the inner edge portion 1322A of the first upper surface portion 1322 when the receptacle metal member 1300B is viewed from above. Accordingly, when the plug connector 2000 is assembled with the receptacle connector 1000 in the vertical direction, the contact piece 1350 can be prevented from being deformed (for example, downwardly dented) unintentionally by the plug connector 2000 being pressed down toward the receptacle connector 1000.

As shown in FIGS. 11 to 13, the inner edge portion 1322A extending from the first inner surface portion 1321 toward the first upper surface portion 1322, and having a portion cut away therefrom may be employed in the receptacle metal member 1300 so as to enhance mass production while maintaining maximum stiffness when the receptacle metal member 1300 of the one embodiment is manufactured.

Figure 14:
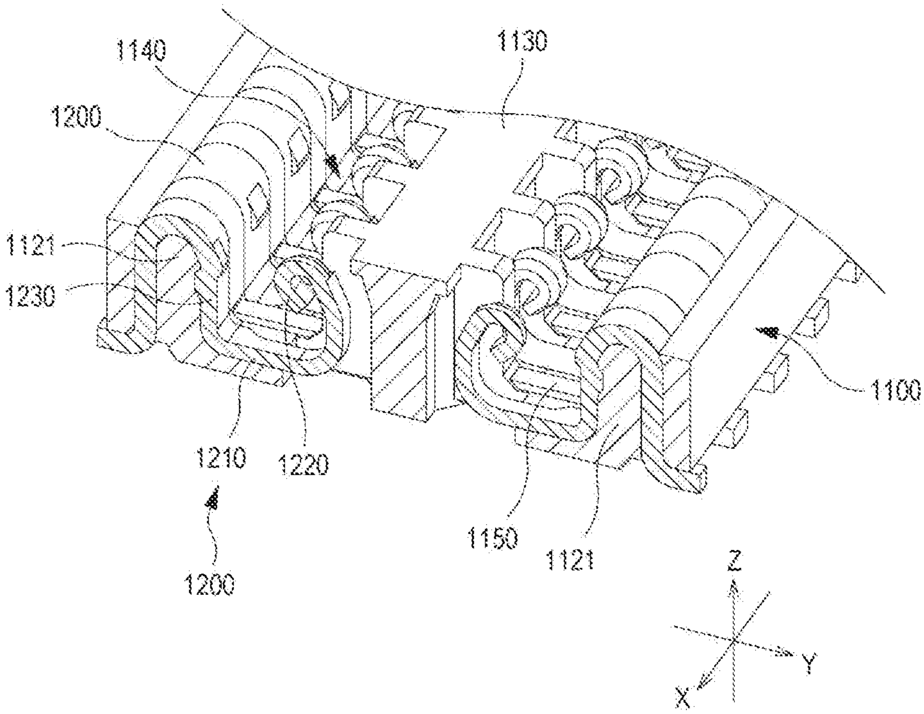
FIG. 14 is a view illustrating a portion of the receptacle connector including a cutaway surface taken on line XIV-XIV of FIG. 1.
Figure 15:
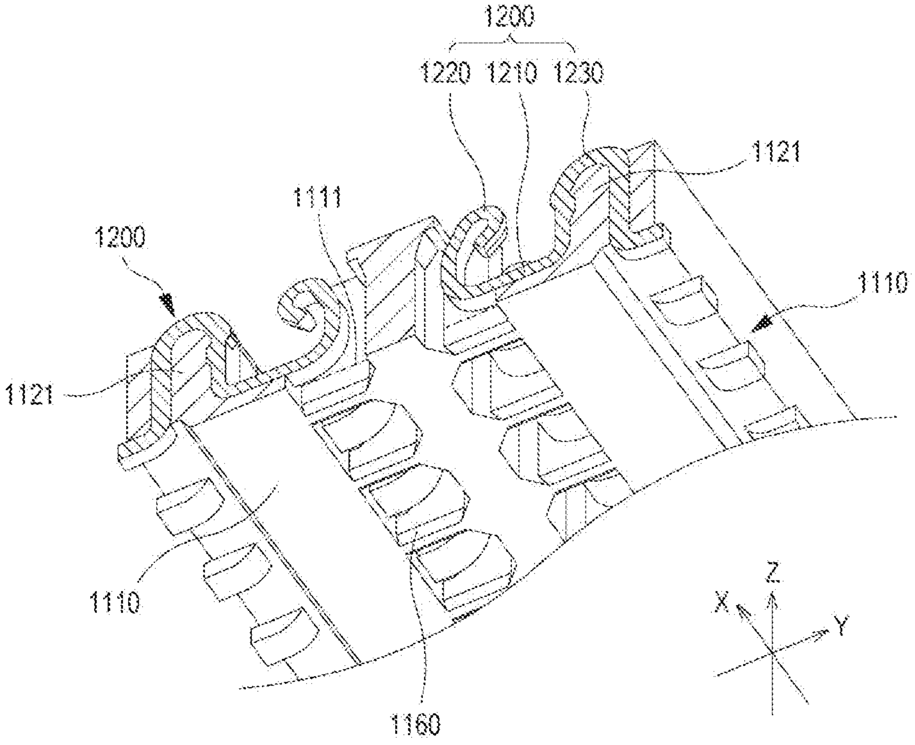
FIG. 15 is a view of a portion of the receptacle connector of FIG. 14 as seen from a different angle.

FIG. 14 is a view illustrating a portion of the receptacle connector 1000 including a cutaway surface taken on line XIV-XIV of FIG. 1, and FIG. 15 is a view illustrating a portion of the receptacle connector 1000 of FIG. 14 as seen from a different angle.

Referring to FIGS. 14 and 15, the plurality of receptacle terminals 1200 may be aligned in portions of the alignment recess 1140 that extend in the first direction (X direction). That is, the plurality of receptacle terminals 1200 may be retained and supported in two rows by the one pair of first surrounding portions 1121 extending in the first direction (X direction).

The receptacle terminal 1200 includes a seating portion 1210 which is seated on the upper surface 1111 of the receptacle bottom 1110 in the alignment recess 1140, and extends in the second direction (Y direction), a contact portion 1220 which extends upwardly from one end of the seating portion 1210 and has a distal end convexly bent toward the inside of the alignment recess 1140, and a filling portion 1230 which is formed on the other end of the seating portion 1210 in the shape of an inverted "U" or a similar shape thereto to allow a resin material molded into the receptacle housing 1100 to be filled therein. Although the receptacle terminal 1200 having the contact portion 1220 having the distal end rolled is employed in the receptacle connector 1000 in the one embodiment, the shape of the receptacle terminal 1200 is not limited thereto.

The receptacle housing 110 of the receptacle connector 1000 in the one embodiment includes a reinforcement rib 1150 disposed between the receptacle terminals 1200 to prevent the receptacle terminal 1200 from being deformed by an external shock. The reinforcement rib 1150 may protrude between the receptacle terminals 1200, and the receptacle terminals 1200 can be prevented from receiving an excessive external shock (for example, a shock caused by contact with the plug connector) by the reinforcement rib 1150 and thus the receptacle terminals 1200 can be protected. That is, a deformation of the receptacle terminal 1200 can be prevented and stability of a contact point of the receptacle terminal 1200 can be guaranteed. In addition, the receptacle housing 1100 is configured to include a rib structure 1160 formed on a lower surface of the receptacle bottom 1110 in the form of a lattice so as to enhance the stiffness of the receptacle connector 1000.

Figure 16:
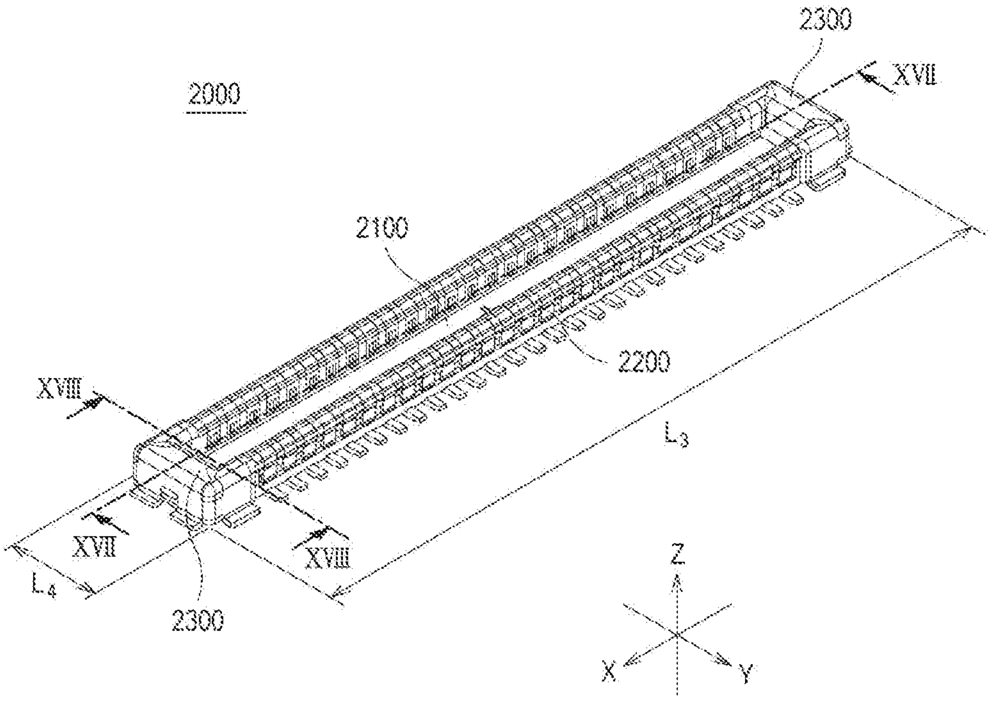
FIG. 16 is a perspective view illustrating a plug connector according to an embodiment of the present disclosure.

FIG. 16 is a perspective view illustrating the plug connector 2000 according to one embodiment of the present disclosure.

Referring to FIG. 16, the plug connector 2000 of the one embodiment may have a complementary structure that can be press-fitted into the receptacle connector 1000 in the vertical direction (Z direction). That is, the plug connector 2000 includes a plug housing 2100 extending in the first direction (X direction), a plurality of plug terminals 2200 retained and supported by the plug housing 2100 and aligned in two rows in the first direction (X direction), and one pair of plug metal members 2300 disposed on both ends of the plug housing 100 in the first direction (X direction). The plug connector 2000 may be mounted on a substrate by SMT.

The plurality of plug terminals 2200 may be formed with a conductive material, for example, a copper alloy or the like, so as to be able to transmit signals in contact with the receptacle terminals 1200 of the receptacle connector 1000. In addition, the plug metal member 2300 is formed with a conductive material, for example, a copper alloy or the like, so as to be able to supply power to each other in contact with the receptacle metal member 1300 of the receptacle connector 1000. The plurality of plug terminals 2200 and the one pair of plug metal members 2300 may be plated to enhance conductivity and an anti-rust property.

The plurality of plug terminals 2200 and the one pair of plug metal members 2300 may be over-molded over an insulation material which is injected into a mold and molded into the plug housing 2100, for example, plastic, a heat-resistant resin, etc. having a heat-resisting property. That is, while the insulation material is molded into the plug housing 2100 in the mold, at least a portion of the insulation material fills the plurality of plug terminals 2200 and the one pair of plug metal members 2300, such that the plug housing 2100, the plurality of plug terminals 2200, and the one pair of plug metal members 2300 are integrally formed with one another.

The plug connector 2000 has a symmetrical structure with respect to a plane which is defined in the first direction (X direction) and the vertical direction (Z direction), and passes through the center of the plug connector 2000 in the second direction (Y direction). In addition, the plug connector 2000 has a symmetrical structure with respect to a plane which is defined in the second direction (Y direction) and the vertical direction (Z direction), and passes through the center of the plug connector 2000 in the first direction (X direction). Herein, the plane defined in the first direction (X direction) and the vertical direction (Z direction) is an XZ plane, and the plane defined in the second direction (Y direction) and the vertical direction (Z direction) is a YZ plane.

Figure 17:
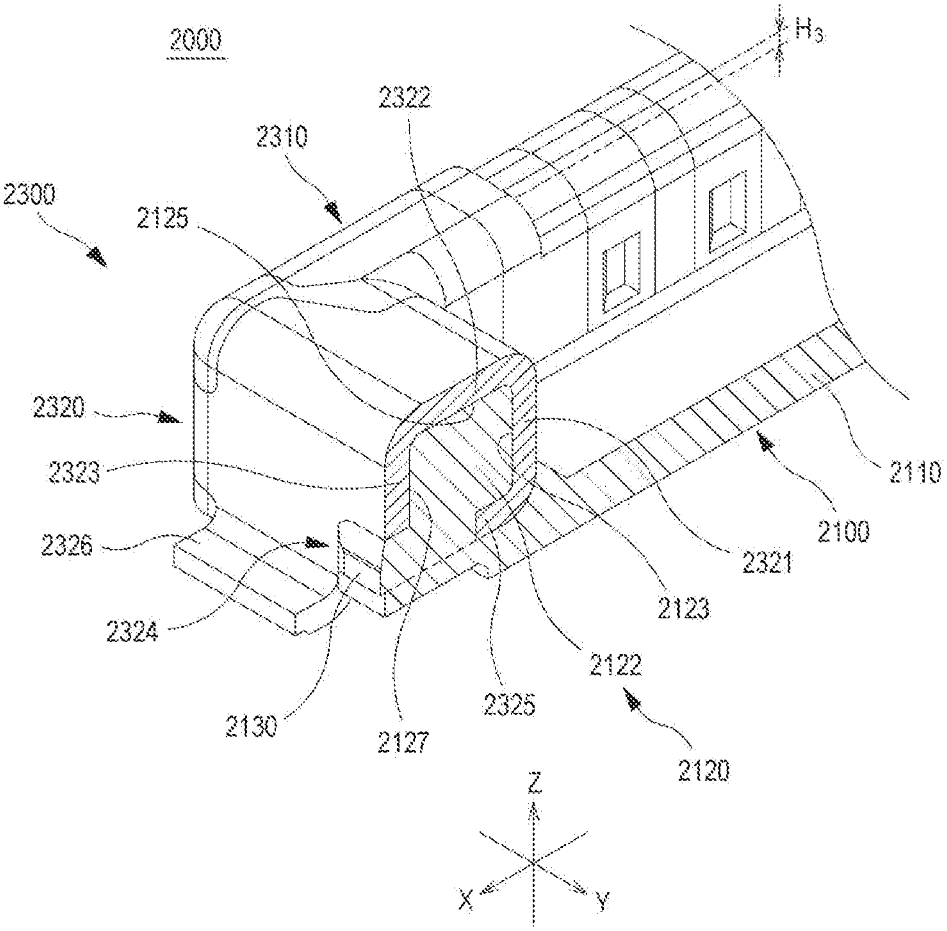
FIG. 17 is a view illustrating a portion of the plug connector including a cutaway surface taken on line XVII-XVII of FIG. 16.
Figure 18:
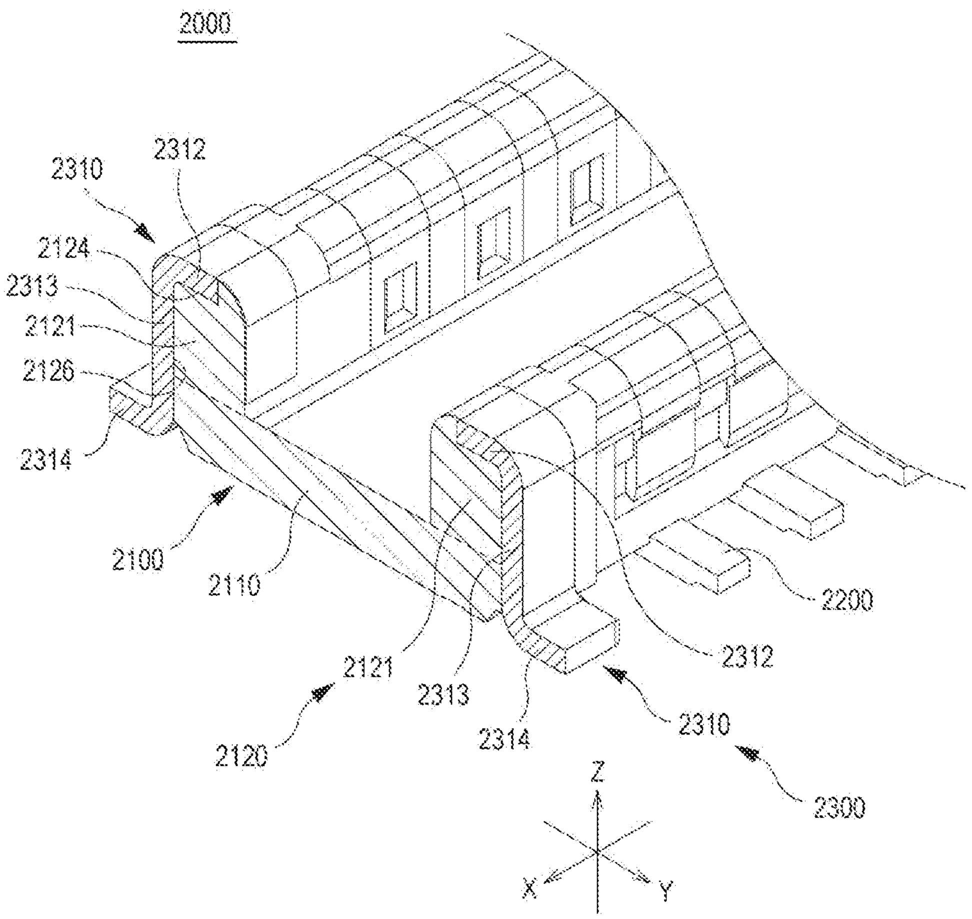
FIG. 18 is a view illustrating a portion of the plug connector including a cutaway surface taken on line XVIII-XVIII of FIG. 16.

FIG. 17 is a view illustrating a portion of the plug connector 2000 including a cutaway surface taken on line XVII-XVII of FIG. 16, and FIG. 18 is a view illustrating a portion of the plug connector 2000 including a cutaway surface taken on line XVIII-XVIII of FIG. 16.

Referring to FIGS. 17 and 18, the plug housing 2100 of the one embodiment includes a plug bottom 2110 and a plug surrounding portion 2120 which protrudes upwardly from an edge of the plug bottom 2100.

The plug housing 2100 may have a substantially rectangular box shape having an upper side opened, or a similar shape thereto. That is, the plug surrounding portion 2120 includes one pair of first surrounding portions 2121 extending in parallel in the first direction (X direction) and facing each other in the second direction (Y direction), and one pair of second surrounding portions 2122 extending in parallel in the second direction (Y direction) and facing each other in the first direction (X direction). A length $L_3$ of the first surrounding portion 2121 extending in the first direction (X direction) is longer than a length $L_4$ of the second surrounding portion 2122 extending in the second direction (Y direction) (see FIG. 16). In addition, the length $L_3$ of the first surrounding portion 2121 corresponds to a length of the alignment recess 1140 of the receptacle connector 1000 in the first direction (X direction), and the length $L_4$ of the second surrounding portion 2122 corresponds to a length of the alignment recess 1140 of the receptacle connector 1000 in the second direction (Y direction).

The plug metal member 2300 may be referred to as a metal piece which can protect the ends of the housing 2100 from an external shock. The plug metal member 2300 of the one embodiment includes a first reinforcement portion 2310 to cover an upper surface 2124 and an outer surface 2125 of each of the one pair of first surrounding portions 2121 on an end of the plug housing 2100, and a second reinforcement portion 2320 to cover an inner surface 2123, an upper surface 2125, and an outer surface 2127 of the second surrounding portion 2122 on the end of the plug housing 2100.

The first reinforcement portion 2310 includes a first upper surface portion 2312 and a first outer surface portion 2313 to cover the upper surface 2124 and the outer surface 2126 of the first surrounding portion 2121. The first upper surface portion 2312 of the first reinforcement portion 2310 may be arranged to be higher than the surrounding portion 2120 extending in the first direction (X direction) between the one pair of plug metal members 2300, that is, the first surrounding portion 2121. That is, the first surrounding portion 2121 between the one pair of plug metal members 2300 may be arranged to have a difference $H_3$ in height from the first upper surface portion 2312. Accordingly, even when an external shock is applied to the plug connector 2000 or the plug connector 2000 is subject to a force when being assembled with the receptacle connector 1000, the external shock or the applied force can be resolved by the plug metal member 2300, such that the plurality of plug terminals 2200 retained and supported by the first surrounding portion 2121 can be prevented from being deformed or damaged.

The second reinforcement portion 2320 includes a second inner surface portion 2321, a second upper surface portion 2322, and a second outer surface portion 2323 to cover the inner surface 2123, the upper surface 2125, and the outer surface 2127 of the second surrounding portion 2122. The second upper surface portion 2322 extends from an upper end of the second inner surface portion 2321, and the second outer surface portion 2323 may extend from the second upper surface portion 2322 to face the second inner surface portion 2321 in the first direction (X direction). The second outer surface portion 2323 of the second inner surface portion 2321 and the second outer surface portion 2323 facing each other in the first direction (X direction) has a penetrating hole 2324 formed thereon.

In the one embodiment, the plug housing 2100 has a protrusion 2130 protruding through the penetrating hole 2324 in the first direction (X direction). The protrusion 2130 may have a contact surface which is flat on the YZ plane.

A bending portion 2325 bent toward the second outer surface portion 2323 may be provided on a lower end of the second inner surface portion 2321 of the second reinforcement portion 2320. The bending portion 2325 may be buried in the plug housing 2100 when the plug connector 2000 is over-molded, thereby securely coupling the plug metal member 2300 to the plug housing 2100.

A bending portion 2326 bent in the opposite direction of the direction facing the second inner surface portion 2321 may be provided on a lower end of the second outer surface portion 2323 of the second reinforcement portion 2320. In addition, a bending portion 2314 bent outward may be provided on a lower end of the first outer surface portion 2313 of the first reinforcement portion 2310. The plug connector 2000 may be mounted on the substrate by soldering the bending portions 2314, 2326 to the substrate, and in this case, the plug connector 2000 may be supported while being spaced apart from the surface of the substrate by the bending portions 2314, 2326.

In the plug metal member 2300, portions (first reinforcement portions) surrounding the first surrounding portions 2121 may be connected to both sides of a portion (second reinforcement portion) surrounding the second surrounding portion 2122 of the plug housing 2100 in the second direction (Y direction), respectively. In the one embodiment, the first outer surface portions 2321 may be connected to both sides of the second outer surface portion 2323 in the second direction (Y direction), respectively.

Hereinafter, a connector assembly 3000 including the above-described receptacle connector 1000 and the plug connector 2000 which is assembled with or disassembled from the receptacle connector 1000 in the vertical direction (Z direction) will be described.

Figure 19:
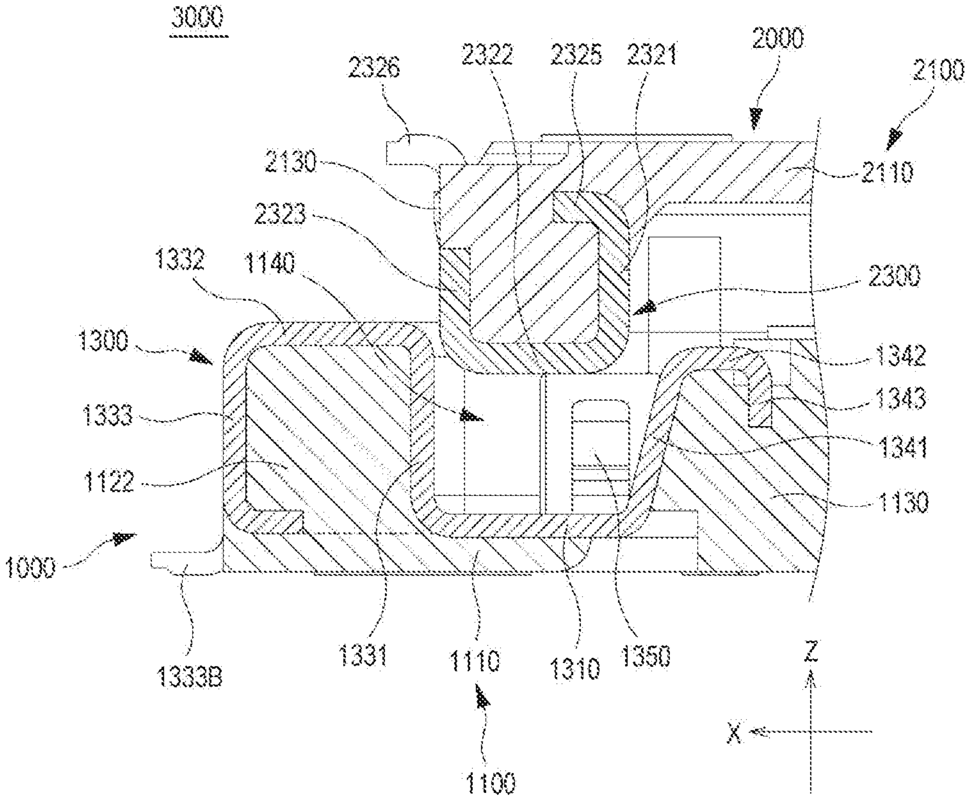
FIG. 19 is a cross-sectional view illustrating a receptacle connector and a plug connector before they are completely assembled in a connector assembly according to one embodiment of the present disclosure.
Figure 20:
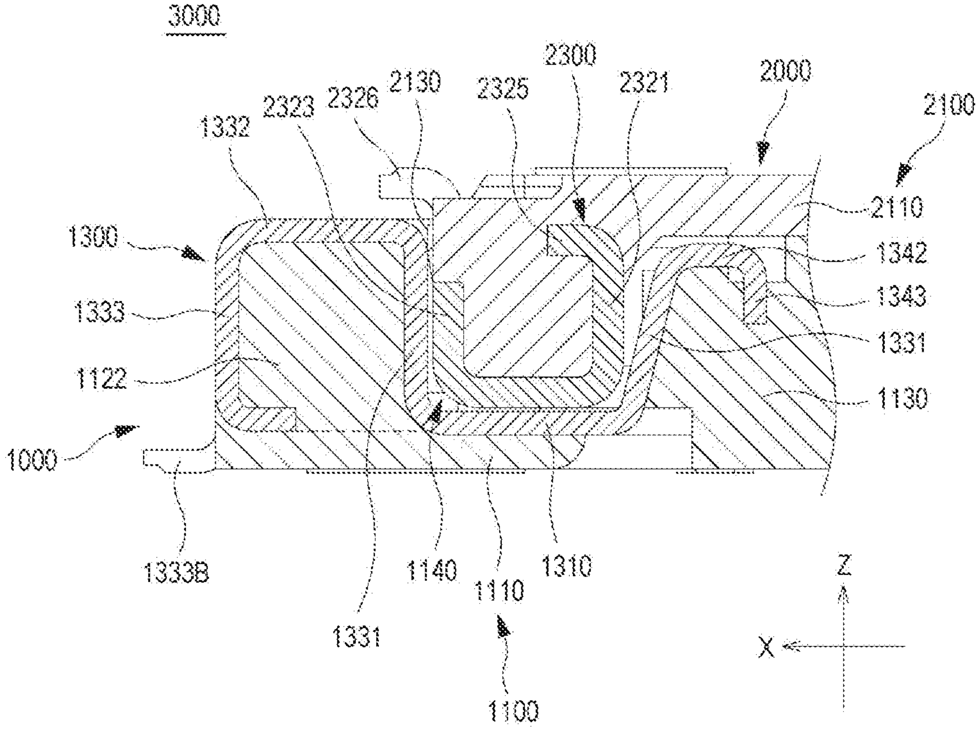
FIG. 20 is a cross-sectional view illustrating the receptacle connector and the plug connector which are completely assembled in the connector assembly according to one embodiment of the present disclosure.

FIG. 19 is a cross-sectional view illustrating the receptacle connector 1000 and the plug connector 2000 before they are completely assembled with each other in the connector assembly 3000 according to one embodiment of the present disclosure, and FIG. 20 is a cross-sectional view illustrating the receptacle connector 1000 and the plug connector 2000 which are completely assembled with each other in the connector assembly 3000 according to one embodiment of the present disclosure. FIGS. 19 and 20 are cross-sectional views of the connector assembly 300 as seen from the second direction (Y direction).

Referring to FIGS. 19 and 20, the plug connector 2000 may move downward to the upper side of the receptacle connector 1000 arranged to have the alignment recess 1140 face up, and may be assembled with the receptacle connector 1000. That is, the substrate on which the receptacle connector 1000 is mounted, and the substrate on which the plug connector 2000 is mounted may be connected.

When the receptacle connector 1000 and the plug connector 2000 are assembled, the plug metal member 2300 of the plug connector 2000 is press-fitted into the alignment recess 1140 in the receptacle metal member 1300 of the receptacle connector 1000. In the connector assembly 3000 of the one embodiment, the third outer surface portion 1341 of the receptacle metal member 1300 has the inclined surface inclining with respect to the base portion 1310, such that the plug metal member 2300 can be fitted into the alignment recess 1140 without interference, and accordingly, the receptacle connector 1000 and the plug connector 2000 can be stably assembled. In addition, the plug connector 2000 moves down to be assembled with the receptacle connector 1000, and accordingly, the protrusion 2130 provided on the plug connector 2000 is brought into surface contact with the second inner surface portion 1331 of the receptacle metal member 1300, such that a contact point position which is misaligned when the receptacle connector 1000 and the plug connector 2000 are assembled can be easily guided to an exact contact point position. In addition, since the plug connector 2000 is assembled with the receptacle connector 1000 with the protrusion 2130 being in contact with the second inner surface portion 1331, the inner surface portion of the receptacle metal member 1300 and the outer surface portion of the plug metal member 2300 are not in direct contact with each other, such that abrasion can be prevented and also the plug connector 2000 can be prevented from shaking in the first direction (X direction).

Figure 21:
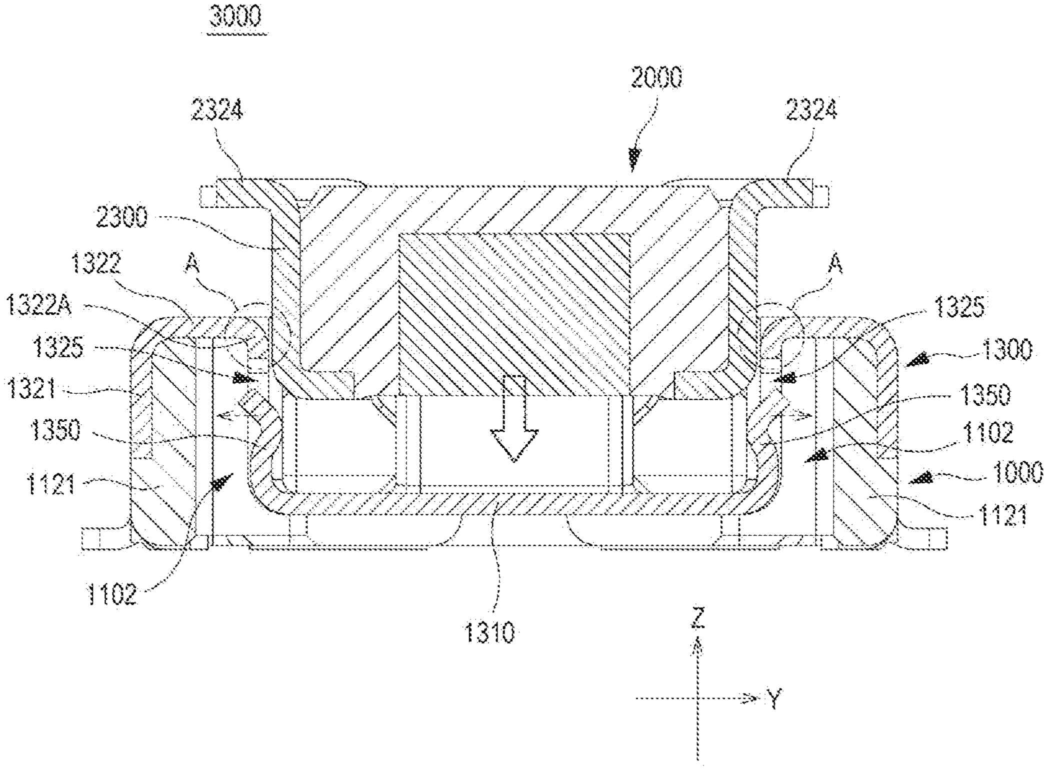
FIG. 21 is a cross-sectional view illustrating the receptacle connector and the plug connector a portion of which is assembled with the receptacle connector in the connector assembly according to one embodiment of the present disclosure.

FIG. 21 is a cross-sectional view illustrating the receptacle connector 1000 and the plug connector 2000 which is assembled with the receptacle connector 1000 in part in the connector assembly 3000 according to one embodiment of the present disclosure. FIG. 21 is a cross-sectional view of the connector assembly 300 as seen from the first direction (X direction). When the receptacle connector 1000 and the plug connector 2000 are assembled, the plug connector 2000 shown in FIG. 16 may be turned over, that is, the plug surrounding portion 2120 protruding upwardly from the edge of the plug bottom 2110 as shown in FIGS. 17 and 18 may be turned over to face down, to be assembled with the receptacle connector 1000. Accordingly, the receptacle connector 1000 and the plug connector 2000 are placed in the vertical direction, and, when the plug connector 2000 is turned over above the receptacle connector 1000 to be assembled, the upper surface 2124 of the first surrounding portion 2121 and the upper surface 2125 of the second surrounding portion may be referred to as lower surfaces facing the receptacle connector 1000.

Referring to FIG. 21, when the plug connector 2000 is press-fitted into the receptacle connector 1000 to be assembled, the one pair of contact pieces 1350 provided on the receptacle metal member 1300 are deformed to be bent in the second direction (Y direction) by being pushed by contact with the plug metal member 2300. In the one embodiment, the elastically deformable contact pieces 1350 are brought into contact with both sides of the plug metal member 2300 in the second direction (Y direction), such that a stable contact between the contact piece 1350 and the plug metal member 2300 can be achieved, and the plug connector 2000 assembled with the receptacle connector 1000 can be prevented from shaking in the second direction (Y direction) (that is, the plug metal member 2300 can be prevented from being loosely press-fitted into the receptacle metal member 1300).

In addition, the receptacle metal member 1300 is configured to have a secure support structure formed in a "⊏" shape or a similar shape thereto, surrounding all of the inner surface of the surrounding portion 1120, the upper surface extending from the inner surface, and the outer surface extending from the upper surface, when seen in cross section as shown in FIG. 21, and to have a rigid structure, and is configured to have a structure capable of protecting the contact point portion (contact piece) when the receptacle connector 1000 and the plug connector 2000 are assembled, such that an unintended deformation of the contact point portion can be prevented. That is, the contact point stability of the contact point portion can be guaranteed.

Although the receptacle connector 1000 employing the receptacle metal member 1300 of the one embodiment is illustrated in FIGS. 19 to 21, the connector assembly 300 may include the receptacle connector employing the receptacle metal member 1300A, 1300B of other embodiments described above, and, even such a receptacle connector may be assembled with or disassembled from the plug connector 2000 in the same way.

Although technical idea of the present disclosure has been described by some embodiments described above and examples illustrated in the accompanying drawings, it should be understood that various substitutions, modifications, and changes can be made within the range without departing from the technical idea and the range of the present disclosure that can be understood by a person skilled in the art. In addition, the substitutions, modifications, and changes should be considered to belong to the claims attached herewith.

The invention claimed is:

1. A receptacle metal member for an end of a receptacle housing to form a receptacle connector, the receptacle metal member comprising:

a base portion configured to cover an end portion of a receptacle bottom of the receptacle housing, the base portion defining an outer end edge that faces in a first direction and first and second outer side edges that face in a second direction;

a pair of first reinforcement portions configured to cover surrounding portions of the receptacle housing, each first reinforcement portion having a continuous extension defining a first inner surface portion and a first upper surface portion extending at an angle therefrom, the first inner surface portion of a first one of the pair of first reinforcement portions extending upwardly from the first outer side edge of the base portion, the first inner surface portion of a second one of the pair of the first reinforcement portions extending upwardly from the second outer side edge of the base portion; and a pair of contact pieces which extend from the base portion.

2. The receptacle metal member as defined in claim 1, further comprises further comprising a second reinforcement portions having a continuous extension defining a second inner surface portion and a second upper surface portion, the second inner surface portion extending upwardly from the outer end edge of the base portion.

3. The receptacle metal member as defined in claim 2, further comprising a third reinforcement portion having a continuous extension defining a third upper surface portion and a third outer surface portion, the third outer surface portion extending upwardly from the base portion and facing the second inner surface portion.

4. The receptacle metal member as defined in claim 1, wherein each contact piece is configured to be elastically deformed by being pressed in the second direction.

5. The receptacle metal member as defined in claim 1, wherein a first one of the contact pieces has a fixed end connected to the first outer side edge of the base portion, and a free end bent upwardly from the fixed end and extending therefrom, and wherein a second one of the contact pieces has a fixed end connected to the second outer side edge of the base portion, and a free end bent upwardly from the fixed end and extending therefrom.

6. The receptacle metal member as defined in claim 1, wherein the continuous extension of each first reinforcement portion further defines a first outer surface portion extending from the first upper surface portion, wherein the first inner surface portion of each first reinforcement portion has a receiving hole formed thereon to receive a portion of the contact piece when the contact piece is pressed toward the first outer surface portion in the second direction.

7. The receptacle metal member as defined in claim 6, wherein the respective receiving hole is extended up to the respective first inner surface portion and an inner edge portion of the first upper surface portion of each first reinforcement portion contacts the respective first upper surface portion.

8. A receptacle connector comprising:

a receptacle housing including a receptacle bottom, a receptacle surrounding portion protruding from an edge of the receptacle bottom, and a center protrusion arranged within the receptacle surrounding portion;

a plurality of receptacle terminals which are retained and supported in the receptacle housing in a first direction; and a pair of receptacle metal members, wherein a first one of the pair of receptacle metal members is provided at a first end of the receptacle housing, and a second one of the pair of receptacle metal members is provided at a second end of the receptacle housing, each receptacle metal member including a base portion configured to cover an end portion of a receptacle bottom of the receptacle housing, the base portion defining an outer end edge that faces in a first direction and first and second outer side edges that face in a second direction, a pair of first reinforcement portions, each first reinforcement portion having a continuous extension defining a first inner surface portion and a first upper surface portion extending therefrom, the first inner surface portion of a first one of the pair of first reinforcement portions extending upwardly from the first outer side edge of the base portion, the first inner surface portion of a second one of the pair of the first reinforcement portions extending upwardly from the second outer side edge of the base portion, and a pair of contact pieces which extend from the base portion.

9. The receptacle connector as defined in claim 8, wherein the first inner surface portion of each first reinforcement portion has a receiving hole is formed thereon to receive a portion of the contact piece, and wherein a receiving recess is formed on the receptacle surrounding portion to be connected with the receiving hole.

10. The receptacle connector as defined in claim 9, wherein the respective receiving hole is extended up to the respective first inner surface portion and an inner edge portion of the first upper surface portion of each first reinforcement portion contacts the respective first upper surface portion.

11. The receptacle connector as defined in claim 8, wherein the first upper surface portion of each continuous extension extends at an angle from the respective first inner surface portion.

12. The receptacle connector as defined in claim 8, wherein each receptacle metal member further comprises a second reinforcement portion having a continuous extension defining a second inner surface portion and a second upper surface portion, the second inner surface portion extending upwardly from the outer end edge of the base portion.

13. The receptacle connector as defined in claim 12, wherein each receptacle metal member further comprises a third reinforcement portion having a continuous extension defining a third upper surface portion and a third outer surface portion, the third outer surface portion extending upwardly from the base portion and facing the second inner surface portion.

14. The receptacle connector as defined in claim 8, wherein each contact piece is configured to be elastically deformed by being pressed in the second direction.

15. The receptacle connector as defined in claim 8, wherein a first one of the contact pieces has a fixed end connected to the first outer side edge of the base portion, and a free end bent upwardly from the fixed end and extending therefrom, and wherein a second one of the contact pieces has a fixed end connected to the second outer side edge of the base portion, and a free end bent upwardly from the fixed end and extending therefrom.

16. A receptacle metal member for an end of a receptacle housing to form a receptacle connector, the receptacle metal member comprising:

a base portion configured to cover an end portion of a receptacle bottom of the receptacle housing, the base portion defining an outer end edge that faces in a first direction and first and second outer side edges that face in a second direction;

a pair of first reinforcement portions configured to cover surrounding portions of the receptacle housing, each first reinforcement portion having a continuous extension defining a first inner surface portion and a first upper surface portion, the first inner surface portion of a first one of the pair of first reinforcement portions extending upwardly from the first outer side edge of the base portion, the first inner surface portion of a second one of the pair of the first reinforcement portions extending upwardly from the second outer side edge of the base portion;

a second reinforcement portion having a continuous extension defining a second inner surface portion and a second upper surface portion, the second inner surface portion extending upwardly from the outer end edge of the base portion; and a pair of contact pieces which extend from the base portion.

17. The receptacle metal member as defined in claim 16, further comprising a third reinforcement portion having a continuous extension defining a third upper surface portion and a third outer surface portion, the third outer surface portion extending upwardly from the base portion and facing the second inner surface portion.

18. The receptacle metal member as defined in claim 16, wherein a first one of the contact pieces has a fixed end connected to the first outer side edge of the base portion, and a free end bent upwardly from the fixed end and extending therefrom, and wherein a second one of the contact pieces has a fixed end connected to the second outer side edge of the base portion, and a free end bent upwardly from the fixed end and extending therefrom.

19. The receptacle metal member as defined in claim 16, wherein the continuous extension of each first reinforcement portion further defines a first outer surface portion extending from the first upper surface portion, wherein the first inner surface portion of each first reinforcement portion has a receiving hole formed thereon to receive a portion of the contact piece when the contact piece is pressed toward the first outer surface portion in the second direction.

20. The receptacle metal member as defined in claim 19, wherein the respective receiving hole is extended up to the respective first inner surface portion and an inner edge portion of the first upper surface portion of each first reinforcement portion contacts the respective first upper surface portion.

* * * * *